(12) United States Patent
Davis

(10) Patent No.: US 11,618,185 B2
(45) Date of Patent: Apr. 4, 2023

(54) TECHNIQUES FOR MANUFACTURING AND COOLING THREE-DIMENSIONAL OBJECTS

(71) Applicant: Shapeways, Inc., Livonia, MI (US)

(72) Inventor: William Carter Davis, New York, NY (US)

(73) Assignee: Shapeways, Inc., Livonia, MI (US)

( * ) Notice: Subject to any disclaimer, the term of this patent is extended or adjusted under 35 U.S.C. 154(b) by 0 days.

(21) Appl. No.: 16/822,749

(22) Filed: Mar. 18, 2020

(65) Prior Publication Data

US 2020/0215763 A1    Jul. 9, 2020

Related U.S. Application Data

(63) Continuation of application No. 15/360,730, filed on Nov. 23, 2016, now Pat. No. 10,647,060.

(51) Int. Cl.
*B29C 35/16* (2006.01)
*B29C 64/393* (2017.01)
(Continued)

(52) U.S. Cl.
CPC ............ *B29C 35/16* (2013.01); *B29C 64/153* (2017.08); *B29C 64/393* (2017.08); *B33Y 40/20* (2020.01);
(Continued)

(58) Field of Classification Search
CPC ... B29C 64/255; B29C 64/165; B29C 64/393; B29C 64/153; B29C 35/16;
(Continued)

(56) References Cited

U.S. PATENT DOCUMENTS 3,146,600 A    9/1964    Cox
4,800,729 A    1/1989    Hara
(Continued)

FOREIGN PATENT DOCUMENTS

WO    WO 2015/170330 A1    11/2015

OTHER PUBLICATIONS

Invitation to Pay Additional Fees for International Application No. PCT/US2017/61968 dated Jan. 19, 2018.
(Continued)

*Primary Examiner* — Alison L Hindenlang
*Assistant Examiner* — Andrés E. Behrens, Jr.
(74) *Attorney, Agent, or Firm* — Wolf, Greenfield & Sacks, P.C.

(57) ABSTRACT

A method of manufacturing three-dimensional (3D) objects is provided. The method includes generating a plan for printing a plurality of 3D objects in a 3D printing medium at least in part by identifying an unprinted area of the 3D printing medium for insertion of a cooling device and determining where at least some of the plurality of 3D objects are to be printed in the 3D printing medium such that none of the at least some of the plurality of 3D objects, when printed, intersect the identified unprinted area for the insertion of the cooling device. The method further includes printing, using a 3D printer, the at least some of the plurality of 3D objects in accordance with the plan and, after the printing, inserting the cooling device into the unprinted area of the 3D printing medium and cooling the 3D printing medium using the cooling device.

20 Claims, 12 Drawing Sheets

(51) Int. Cl.
  *B29C 64/153*   (2017.01)
  *B33Y 50/02*    (2015.01)
  *B33Y 40/20*    (2020.01)
(52) U.S. Cl.
  CPC ...... *B33Y 50/02* (2014.12); *B29C 2035/1616* (2013.01); *B29C 2035/1625* (2013.01); *B29C 2035/1658* (2013.01)
(58) Field of Classification Search
  CPC .... B29C 2035/1658; B29C 2035/1616; B29C 2035/1625; B29C 64/171; B29C 64/176; B29C 64/182; B29C 64/188; B29C 64/194; B29C 64/364; B29C 64/371; B29C 64/386; B23K 26/00; B33Y 50/02; B33Y 30/00; B33Y 40/00; B33Y 10/00; B22F 3/10; B22F 3/1017
  See application file for complete search history.

(56) References Cited

U.S. PATENT DOCUMENTS

| | | | |
|---|---|---|---|
| 5,352,405 | A | 10/1994 | Beaman et al. |
| 5,753,274 | A * | 5/1998 | Wilkening ............. B23K 26/34 425/174.4 |
| 6,932,935 | B1 | 8/2005 | Oberhofer et al. |
| 7,521,652 | B2 | 4/2009 | Chung et al. |
| 10,647,060 | B2 * | 5/2020 | Davis ..................... B33Y 40/00 |
| 2002/0053422 | A1 | 5/2002 | Juslenius et al. |
| 2004/0247734 | A1 | 12/2004 | Unterlander et al. |
| 2006/0016586 | A1 | 1/2006 | Nail |
| 2006/0118532 | A1 * | 6/2006 | Chung .................. B29C 64/153 219/121.85 |
| 2007/0001342 | A1 * | 1/2007 | Oberhofer ............. B33Y 10/00 264/237 |
| 2007/0045891 | A1 | 3/2007 | Martinoni et al. |
| 2009/0183860 | A1 | 7/2009 | Krencker et al. |
| 2009/0266509 | A1 | 10/2009 | Pussell |
| 2010/0126432 | A1 | 5/2010 | Eberle et al. |
| 2010/0155985 | A1 | 6/2010 | McAlea et al. |
| 2014/0014300 | A1 | 1/2014 | Hwang et al. |
| 2014/0083654 | A1 * | 3/2014 | Buch ....................... B01J 6/005 165/109.1 |
| 2015/0201500 | A1 | 7/2015 | Shinar et al. |
| 2017/0173696 | A1 | 6/2017 | Sheinman |
| 2018/0141285 | A1 | 5/2018 | Davis |
| 2018/0141286 | A1 | 5/2018 | Davis |
| 2018/0326662 | A1 | 11/2018 | Guther et al. |

OTHER PUBLICATIONS

International Search Report and Written Opinion for International Application No. PCT/US2017/061968 dated Mar. 8, 2018.
International Preliminary Report on Patentability for International Application No. PCT/US2017/061968 dated Jun. 6, 2019.
Extended European Search Report dated Jun. 15, 2020 in connection with European Application No. 17874766.3.
PCT/US2017/061968, Jan. 19, 2018, Invitation to Pay Additional Fees.
PCT/US2017/061968, Mar. 8, 2018, International Search Report and Written Opinion.
PCT/US2017/061968, Jun. 6, 2019, International Preliminary Report on Patentability.
EP 1787466.3, Jun. 15, 2020, Extended European Search Report.

* cited by examiner

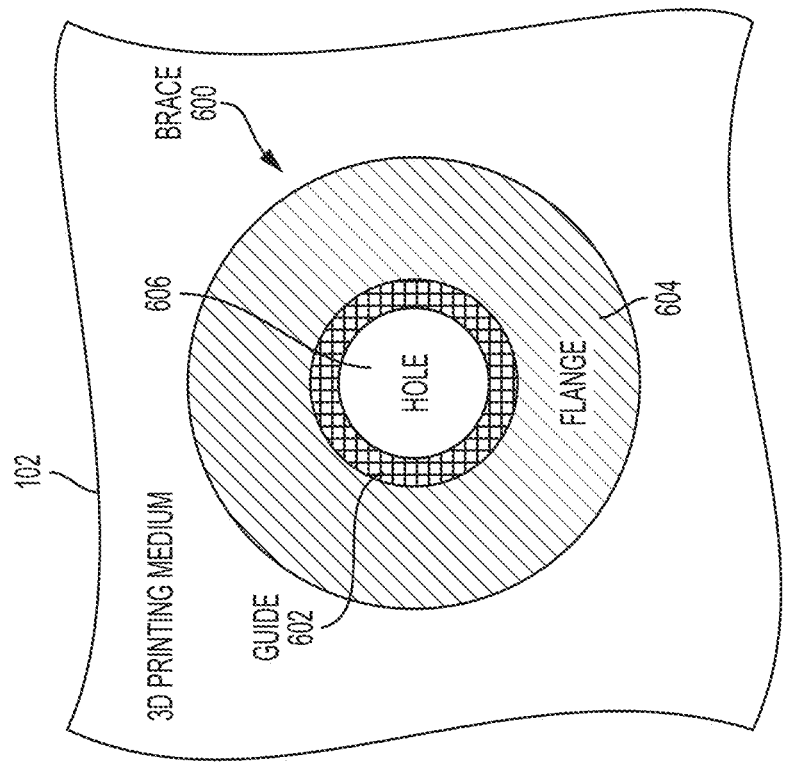
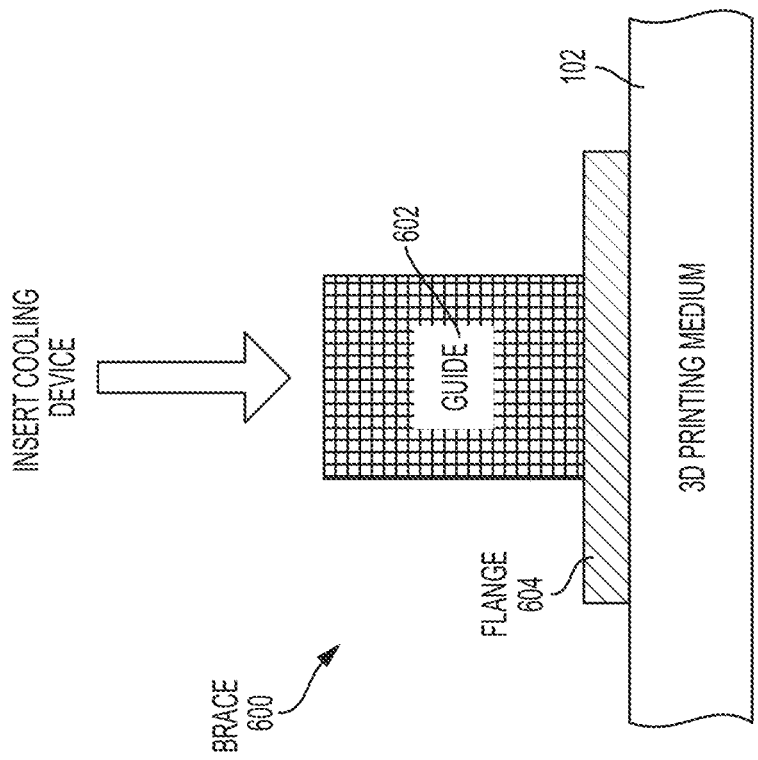

US 11,618,185 B2

TECHNIQUES FOR MANUFACTURING AND COOLING THREE-DIMENSIONAL OBJECTS

RELATED APPLICATIONS

This application claims priority under 35 U.S.C. § 120 and is a continuation of U.S. patent application Ser. No. 15/360,730, filed Nov. 23, 2016, entitled "TECHNIQUES FOR MANUFACTURING AND COOLING THREE-DIMENSIONAL OBJECTS," which is incorporated by reference in its entirety.

FIELD

Aspects of the technology described herein relate to three-dimensional (3D) printing and processing of 3D printed objects. Some aspects relate to techniques for cooling a 3D printing medium containing 3D printed objects.

BACKGROUND

Some three-dimensional (3D) printing techniques print an object by successively forming a series of material layers in accordance with a 3D model of the object to be printed. Some companies, such as SHAPEWAYS, provide on-demand 3D printing services where customers may upload custom 3D models, select materials, and order printed objects to be built from selected materials. These on-demand printing services allow customers to convert a custom 3D model into any number of printed objects without the expense of purchasing and operating a 3D printer.

SUMMARY

According to at least one aspect, a method of manufacturing three-dimensional (3D) objects is provided. The method includes generating a plan for printing a plurality of 3D objects in a 3D printing medium at least in part by identifying at least one unprinted area of the 3D printing medium for insertion of at least one cooling device and determining where at least some of the plurality of 3D objects are to be printed in the 3D printing medium such that none of the at least some of the plurality of 3D objects, when printed, intersect the identified at least one unprinted area for the insertion of the at least one cooling device. The method further includes printing, using a 3D printer, the at least some of the plurality of 3D objects in accordance with the plan and, after the printing, inserting the at least one cooling device into the at least one unprinted area of the 3D printing medium and cooling the 3D printing medium using the at least one cooling device.

In some embodiments, the method further includes marking the identified at least one unprinted area using the 3D printer. In some embodiments, the method further includes identifying, after the printing and based on the marking, at least one access point to the at least one unprinted area of the 3D printing medium. In some embodiments, marking the identified at least one unprinted area using the 3D printer includes printing at least one 3D marking object on a surface of the 3D printing medium. In some embodiments, generating the plan for printing the plurality of 3D objects includes determining where the at least one 3D marking object is to be printed on the surface of the 3D printing medium.

In some embodiments, generating the plan for printing the plurality of 3D objects includes determining a number of unprinted areas to include in the 3D printing medium. In some embodiments, determining the number of unprinted areas includes determining the number of unprinted areas to include in the 3D printing medium based on a size of the 3D printing medium. In some embodiments, determining the number of unprinted areas includes determining the number of unprinted areas to include in the 3D printing medium based on a desired cooling time of the 3D printing medium.

In some embodiments, the 3D printing medium includes quadrants and wherein identifying the at least one unprinted area of the 3D printing medium includes identifying four unprinted areas, each of the four unprinted areas located at a boundary between a respective pair of the quadrants. In some embodiments, inserting the at least one cooling device comprises vertically inserting a cooling device into each of the four unprinted areas.

In some embodiments, the 3D printing medium includes quadrants and wherein identifying the at least one unprinted area of the 3D printing medium includes identifying an unprinted area in a region of the 3D printing medium that spans at least two quadrants of the quadrants. In some embodiments, the at least one cooling device comprises a first cooling device and a second cooling device, wherein identifying the at least one unprinted area of the 3D printing medium includes identifying a first unprinted area that allows for vertical insertion of the first cooling device and a second unprinted area that allows for horizontal insertion of the second cooling device.

In some embodiments, the method further includes placing a brace on the 3D printing medium after the printing. In some embodiments, inserting the at least one cooling device includes inserting one cooling device through the brace and into the 3D printing medium.

In some embodiments, printing the at least some of the plurality of 3D objects includes printing the at least some of the plurality of 3D objects in the 3D printing medium in a frame, the frame comprising sidewalls and a tray coupled to the sidewalls. In some embodiments, the method further includes removing the sidewalls from the frame after printing. In some embodiments, the method further includes wrapping at least part of the 3D printing medium with a wrap after removing the sidewalls.

In some embodiments, the method further includes monitoring temperature of the 3D printing medium and removing the at least some of the plurality of 3D printed objects from the 3D printing medium when the temperature of the 3D printing medium is less than a threshold temperature. In some embodiments, the threshold temperature is 70 degrees centigrade.

In some embodiments, the 3D printing medium comprises at least one of Nylon 11 and Nylon 12. In some embodiments, printing the at least some of the plurality of 3D objects is performed using selective laser sintering (SLS).

In some embodiments, the 3D printing medium comprises a powdered material and wherein substantially all of the powdered material (e.g., at least 90%, at least 95%, at least 99%, at least 99.9%, 100%) in the at least one unprinted area is not fused by the 3D printer during the printing. In some embodiments, cooling the 3D printing medium using the at least one cooling device includes passing a fluid through the cooling device.

According to at least one aspect, a method of manufacturing three-dimensional (3D) objects is provided. The method includes generating a plan for printing a plurality of 3D objects in a 3D printing medium and printing, using a 3D printer, at least some of the plurality of 3D objects in accordance with the plan. The method further includes, after the printing, wrapping at least part of the 3D printing medium with a wrap, inserting the at least one cooling device into the 3D printing medium, and cooling the 3D printing medium using the wrap and the at least one cooling device.

In some embodiments, the wrap includes a cellophane plastic wrap. In some embodiments, generating the plan includes identifying at least one unprinted area of the 3D printing medium for insertion of at least one cooling device and determining where the at least some of the plurality of 3D objects are to be printed in the 3D printing medium such that none of the at least some of the plurality of 3D objects, when printed, intersect the identified at least one unprinted area for the insertion of the at least one cooling device. In some embodiments, inserting the at least one cooling device includes inserting the at least one cooling device into the at least one unprinted area of the 3D printing medium. In some embodiments, the method further includes marking the identified at least one unprinted area using the 3D printer. In some embodiments, the method further includes identifying, after the printing and based on the marking, at least one access point to the at least one unprinted area of the 3D printing medium.

In some embodiments, printing the at least some of the plurality of 3D objects is performed using selective laser sintering (SLS). In some embodiments, inserting the at least one cooling device into the 3D printing medium includes inserting the at least one cooling device into the 3D printing medium after wrapping the at least part of the 3D printing medium with the wrap.

According to at least one aspect, a cooling system is provided. The cooling system includes at least one cooling device configured to be inserted into a 3D printing medium and to remove heat from the 3D printing medium via a fluid, at least one brace configured to support the at least one cooling device in the 3D printing medium, and a refrigerator configured to be fluidly coupled to the at least one cooling device and to cool the fluid.

In some embodiments, the refrigerator is a heat exchanger that removes heat from the fluid (e.g., by transferring the heat from the fluid to air or other fluid). In some embodiments, the fluid comprises a refrigerant that changes from a liquid state to a gaseous state in the refrigerator. In some embodiments, the fluid comprises a liquid including water, propylene glycol, or water and propylene glycol. In some embodiments, the at least one cooling device includes four cooling devices and the at least one brace includes four braces, each of the four braces being configured to support one respective cooling device of the four cooling devices in a substantially vertical position (e.g., ±20 degrees, ±10 degrees, ±5 degrees, or ±2 degrees) in the 3D printing medium. In some embodiments, the at least one brace is configured to support the at least some of the at least one cooling device in one of a substantially vertical position (e.g., ±20 degrees, ±10 degrees, ±5 degrees, or ±2 degrees) and a substantially horizontal position (e.g., ±20 degrees, ±10 degrees, ±5 degrees, or ±2 degrees) in the 3D printing medium. In some embodiments, the at least one brace is configured to support two cooling devices in a horizontal position in the 3D printing medium.

In some embodiments, the cooling device includes a tube having a first portion to receive the fluid from the refrigerator and a second portion to provide the fluid to the refrigerator. In some embodiments, the tube includes a bend of approximately 180 degrees (e.g., ±20 degrees, ±10 degrees, ±5 degrees, or ±2 degrees) between the first and second portions of the tube. In some embodiments, the tube comprises copper and has a diameter of approximately 0.25 inches (e.g., ±0.20 inches, ±0.10 inches, ±0.05 inches, or ±0.01 inches). In some embodiments, the first portion of the tube is twisted with the second portion of the tube. In some embodiments, the cooling device includes a handle coupled to the tube.

In some embodiments, the cooling system includes a coolant line to fluidly couple the refrigerator to the at least one cooling device. In some embodiments, the cooling device includes at least one fitting for fluidly coupling the cooling device to the coolant line. In some embodiments, the coolant line includes at least one flexible tube.

According to at least one aspect, a cooling device for cooling a 3D printing medium is provided. The cooling device includes a tube configured for insertion into a 3D printing medium, the tube including a first portion for receiving fluid, a second portion for providing the fluid, and an approximately 180 degree (e.g., ±20 degrees, ±10 degrees, ±5 degrees, or ±2 degrees) bend between the first and second portions of the tube where the first portion of the tube is twisted with the second portion of the tube. The cooling device further includes a handle coupled to the tube and configured to ease insertion of the tube into the 3D printing medium by a user.

In some embodiments, the cooling device further includes at least one fitting to fluidly couple the tube to a coolant line. In some embodiments, the tube comprises copper and has a diameter of approximately 0.25 inches (e.g., ±0.20 inches, ±0.10 inches, ±0.05 inches, or ±0.01 inches). In some embodiments, the handle comprises Nylon. In some embodiments, the first portion of the tube is configured to receive the fluid from a refrigerator and wherein the second portion of the tube is configured to provide the fluid to the refrigerator.

According to at least one aspect, a method of manufacturing a cooling device is provided. The method includes receiving a tube, bending the tube approximately 180 degrees (e.g., ±20 degrees, ±10 degrees, ±5 degrees, or ±2 degrees), twisting a first portion of the tube with a second portion of the tube, and attaching a handle to the tube.

In some embodiments, receiving the tube includes receiving a straight copper tube. In some embodiments, bending the tube approximately 180 degrees (e.g., ±20 degrees, ±10 degrees, ±5 degrees, or ±2 degrees) includes bending the tube approximately 90 degrees (e.g., ±10 degrees, ±5 degrees, ±2.5 degrees, or ±1 degree), inserting water into the tube, freezing the water in the tube, and further bending the tube approximately 90 degrees (e.g., ±10 degrees, ±5 degrees, ±2.5 degrees, or ±1 degree) to yield a bend that is approximately 180 degrees (e.g., ±20 degrees, ±10 degrees, ±5 degrees, or ±2 degrees). In some embodiments, the method further includes printing the handle with a 3D printer. In some embodiments, the method further includes, after twisting the first portion of the tube with the second portion of the tube, heating the tube and melting a solder onto the tube.

BRIEF DESCRIPTION OF THE DRAWINGS

Various aspects and embodiments will be described with reference to the following figures. It should be appreciated that the figures are not necessarily drawn to scale. Items appearing in multiple figures are indicated by the same or a similar reference number in all the figures in which they appear.

FIG. 6A shows a side view of an example brace for a cooling device, according to some embodiments of the technology described herein;

FIG. 6B shows a top view of the example brace of FIG. 6A, according to some embodiments of the technology described herein;

DETAILED DESCRIPTION

Figure 1B:
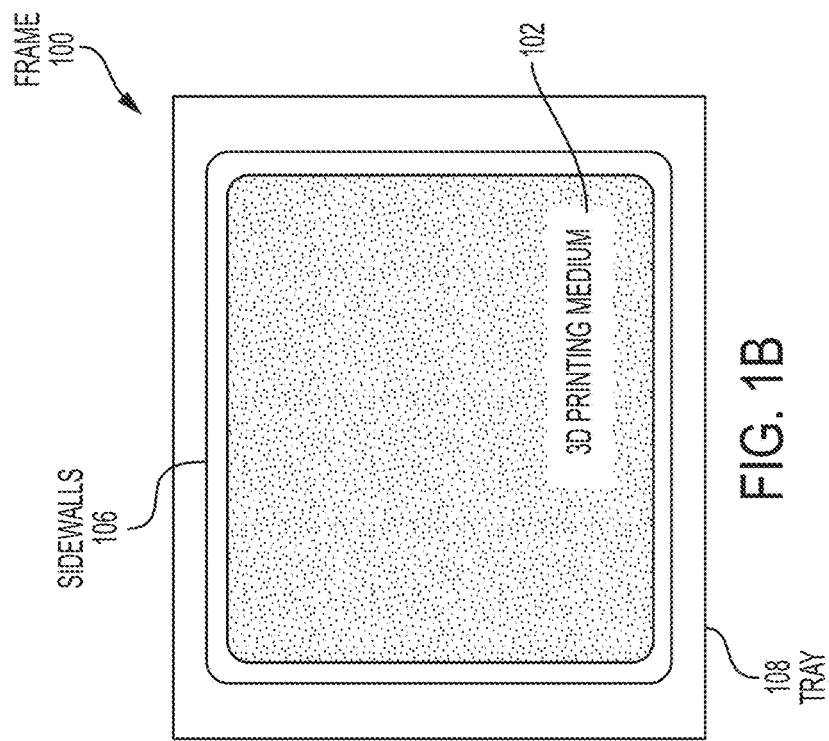
FIG. 1B shows a top view of the example frame of FIG. 1A, according to some embodiments of the technology described herein.

Aspects of the technology described herein are directed to improved on-demand printing processes. In an on-demand 3D printing process, a service provider may receive a custom 3D model from a customer and schedule the custom 3D model to be built by a 3D printer, such as a selective laser sintering (SLS) 3D printer or a selective laser melting (SLM) 3D printer, in a 3D printing medium with one or more other 3D models. For example, the 3D printing medium may be used to print 50-800 objects. The 3D printing medium may be too hot to handle (e.g., 170 degrees centigrade) upon the completion of the printing process. Conventional techniques for cooling the 3D medium include removing the 3D printing medium from the 3D printer after printing completes and leaving the 3D printing medium on an open air rack to cool to a desired temperature for handling (e.g., 70 degrees centigrade). Once the 3D printing medium has cooled, the 3D printed objects in the 3D printing medium are manually removed from the 3D printing medium for subsequent processing. Such conventional techniques are extremely time consuming and constitute a significant portion of the overall time required to fulfill a customer order. For example, the 3D printing medium may take multiple days to cool to an appropriate temperature for handling.

Accordingly, the inventors have developed techniques for rapidly cooling the 3D printing medium to reduce the overall time required to process customer orders. For example, in some embodiments, the print plans that instruct a 3D printer to print 3D objects in the 3D printing medium may be specially designed to include one or more unprinted areas in the 3D printing medium. The unprinted area(s) may be adapted to receive one or more cooling devices, such that the cooling device(s) may be inserted into the 3D printing medium without damaging the 3D printed objects contained therein. The cooling device(s) may remove heat from the 3D printing medium thereby reducing the time required to cool the 3D printing medium.

Some aspects of the technology described herein are related to a method of printing a plurality of 3D objects in a 3D printing medium and, subsequently, cooling the 3D printing medium using a cooling system. The method may include generating a plan for printing a plurality of 3D objects in a 3D printing medium. The plan may be generated by, for example, a print planner application being executed on a computer system in communication with a 3D printer. The plan may include an indication of where each 3D object is to be printed in the 3D printing medium. Generating the plan may include identifying at least one unprinted area of the 3D printing medium for the insertion of at least one cooling device. For example, the unprinted area may be a column (or a row) that extends from an external surface of the 3D printing medium into the 3D printing medium. The dimensions of the column may be selected such that a cooling device may be inserted into the 3D printing medium without damaging the 3D printed objects in the 3D printing medium. After the unprinted areas have been identified in the 3D printing medium, the location of the plurality of 3D objects that are to be printed in the 3D printing medium may be determined such that none of the plurality of 3D objects, when printed, intersect the identified at least one unprinted area for the insertion of the at least one cooling device. In this way, inserting a cooling device into an unprinted area will not damage any of the printed 3D projects in the 3D printing medium. The at least one unprinted area in the 3D printing medium may be marked to ease identification of the at least one unprinted area. For example, a marker may be printed on (or proximate) a surface of the 3D printing medium to mark an access point to an unprinted area. Marking of the at least one unprinted area facilitates the insertion of a cooling device into the medium by providing an operator a visual cue for where to insert the cooling device.

Once the printing plan has been generated, the plan may be provided to a 3D printer, such as an SLS printer or SLM printer, to print the objects in the plan. The 3D printer may receive the plan and print 3D objects in a 3D printing medium in accordance with the received plan. After printing, the 3D printing medium may be removed from the 3D printer and cooled.

In some embodiments, the 3D printing medium may be cooled by one or more cooling devices inserted into the unprinted areas in the 3D printing medium. In these embodiments, the unprinted areas may be identified by locating the markers 3D printed on (or proximate) a surface of the at least one unprinted area. The markers may be removed from the 3D printing medium and braces may be placed at the same location as the marker. The braces may be configured to guide the insertion of the cooling devices into the 3D printing medium such that the cooling devices enter the 3D printing medium at an angle that is approximately perpendicular (e.g., ±20 degrees, ±10 degrees, ±5 degrees, or ±2 degrees) to a surface of the 3D printing medium that the cooling device penetrates. For example, a brace may include a guide coupled to a flange that is configured to rest on a surface of the 3D printing medium. The brace may include a hole at the center of the guide that allows the cooling device to be inserted through the brace. Once the cooling devices have been inserted into the 3D printing medium, the cooling devices may be operated to cool the 3D printing medium. For example, the cooling devices may include a tube that is configured to circulate fluid that is colder than the 3D printing medium to extract heat from the 3D printing medium. The fluid circulated through the cooling devices may be cooled, for example, by using refrigeration techniques.

In some embodiments, in addition to or instead of cooling a 3D printing medium by inserting one or more cooling devices into the 3D printing medium, one or more other cooling techniques may be employed to expedite the cooling of the 3D printing medium. For example, the inventors have devised compression techniques to compress the 3D printing medium to remove at least a portion of the air trapped in the unfused medium of the 3D printing medium to allow heat to escape more easily from the 3D printing medium. Removing air trapped in the unfused medium decreases the cooling time required because the air trapped in the 3D printing medium acts as an insulator and thereby slows the heat transfer between the 3D printing medium and the ambient air.

Accordingly, in some embodiments, the 3D printing medium may be cooled after printing by wrapping the 3D printing medium with a wrap to compress the 3D printing medium. For example, the 3D printing medium may be disposed on a tray coupled to sidewalls. In this example, the sidewalls may be removed to expose a majority of the 3D printing medium and the exposed 3D printing medium may be wrapped with a wrap (e.g., a plastic wrap such as, for instance, a cellophane wrap). It should be appreciated that all or any portion of the 3D printing medium may be wrapped to compress the 3D printing medium. Cooling devices may be inserted into the 3D printing medium after wrapping the 3D printing medium to further reduce the cooling time.

According to some aspects, a cooling system is disclosed herein that is constructed to cool the 3D printing medium after printing. The cooling system may circulate a fluid through the 3D printing medium and cool the circulating fluid to remove heat from the 3D printing medium. The cooling system may include at least one cooling device configured to be inserted into a 3D printing medium that may be operated to remove heat from the 3D printing medium. For example, the cooling device may include a tube twisted in a spiral shape with an approximately 180 degree (e.g., ±20 degrees, ±10 degrees, ±5 degrees, or ±2 degrees) bend in the center of the tube. In this example, the tube may be inserted into the 3D printing medium and a fluid may be circulated through the tube to cool the 3D printing medium. The cooling system may further include at least one brace configured to support the at least one cooling device cooling device in the 3D printing medium. For example, the brace may include a flange that rests on the 3D printing medium that is coupled to a guide with a hole in the center. The hole in the center of the guide may be configured to allow insertion of the at least one cooling device through the hole and into the 3D printing medium. The guide may assist an operator insert the cooling device into the 3D printing medium at an angle that is approximately perpendicular (e.g., ±20 degrees, ±10 degrees, ±5 degrees, or ±2 degrees) to a surface of the 3D printing medium that is penetrated by the cooling device.

In some embodiments, the cooling system may include a refrigerator configured to be fluidly coupled to the at least one cooling device and to cool the fluid. In these embodiments, the refrigerator may receive warm fluid from the at least one cooling device, cool the received warm fluid, and provide the cool fluid back to the at least one cooling device. The refrigerator may be, for example, a heat exchanging device that transfers heat from the fluid to the ambient air. Example heat exchanging devices include radiators and condenser coils. The cooling system may include a pump to circulate the fluid through the at least one cooling device. For example, the pump may be part of the refrigerator or other part of the cooling system. In some examples, the fluid may be a liquid including at least one of water and propylene glycol. In other examples, the fluid may be a refrigerant that changes state between a liquid state and a gaseous state in the refrigerator as part of the cooling process.

It should be appreciated that the embodiments described herein may be implemented in any of numerous ways. Examples of specific implementations are provided below for illustrative purposes only. It should be appreciated that these embodiments and the features/capabilities provided may be used individually, all together, or in any combination of two or more, as aspects of the technology described herein are not limited in this respect.

Figure 1A:
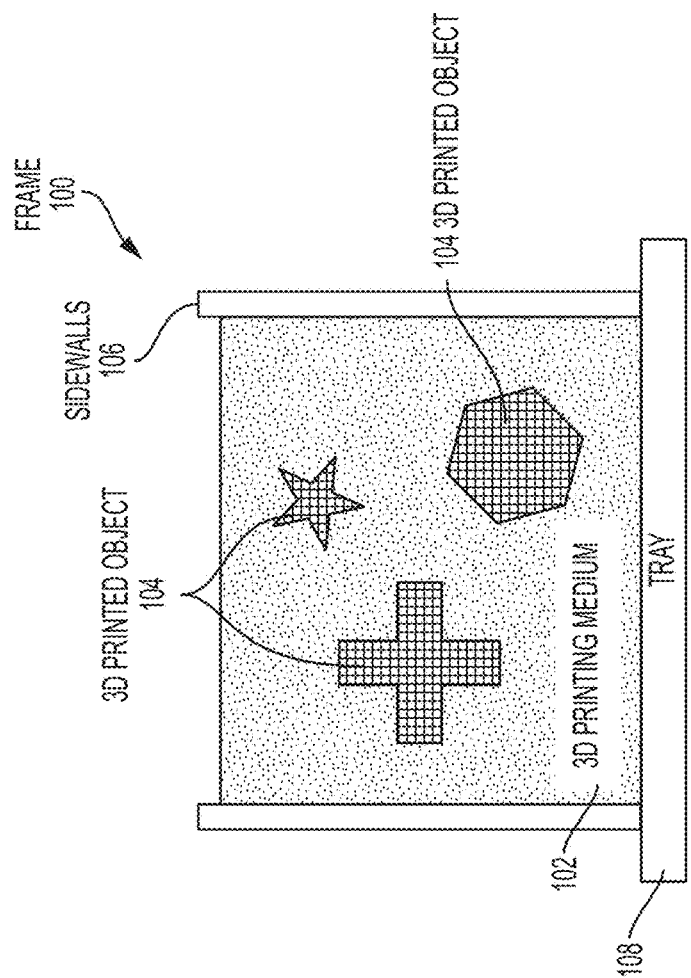
FIG. 1A shows a cross-sectional view of an example frame including printed objects in a 3D printing medium, according to some embodiments of the technology described herein.

Some additive 3D printing techniques, such as SLS and SLM, may form 3D printed objects by fusing portions of a 3D printing medium together with a laser. The 3D printing medium may be in a powdered form that may be fused through the application of heat by the laser. These 3D printers typically receive a frame, load a 3D printing medium (e.g., a medium consisting of unfused powder) into the frame, and fire a laser at the 3D printing medium in the frame to fuse select portions of the 3D printing medium. An example of such a frame, after printed objects have been formed in the 3D printing medium, is shown by frame 100 in FIGS. 1A and 1B. FIG. 1A illustrates a cross-sectional view of the frame 100 and FIG. 1B illustrates a top view of the frame 100. As shown, the frame 100 includes a tray 108 attached to sidewalls 106 and contains a 3D printing medium 102 with 3D printed objects 104 interspersed in the 3D printing medium 102. The 3D printing medium 102 in the frame 100 may comprise any of a variety of materials such as metal, plastic, composite, sand, or any combination thereof. For example, the printing medium 102 may include Nylon 11 and/or Nylon 12.

In some embodiments, the frame 100 may be used with a 3D printer to create the 3D printed objects 104 in the 3D printing medium 102. In these embodiments, an empty frame 100 (without the 3D printing medium 102 and the 3D printed objects 104) may be loaded into the 3D printer. The 3D printer may load a layer of the 3D printing medium 102 into the frame 100 and use a laser to fuse portions of the 3D printing medium 102 to form a portion of one or more printed objects 104. The laser may fuse the desired portions of the 3D printing medium 102 through the application of heat to targeted portions of the 3D printing medium 102. Once the appropriate portions of the layer of the 3D printing medium 102 have been formed, the 3D printer may add an additional layer of the 3D printing medium 102 to the frame 100 and use the laser to fuse portions of the 3D printing medium together. The 3D printer may fuse a portion of the 3D printing medium 102 in the additional layer to the previously fused 3D printing medium 102 in the previous layer to form printed objects that extend through multiple layers of the 3D printing medium 102. It should be appreciated that additional layers of 3D printing medium 102 may be added to the frame 102 and fused with a laser to form the 3D printed objects 104. Further, the thickness of each layer of 3D printing medium 102 added to the frame 100 may vary based on the particular implementation.

The particular portions of each layer that are fused or left unfused may be determined by the 3D printer in accordance with a print plan. For example, the print plan may include instructions for the 3D printer indicating the appropriate portions of the 3D printing medium 102 to fuse to form the desired 3D printed objects.

The 3D printing medium 102 in the frame 100 may be too hot to handle immediately after the printing process completes. For example, the 3D printing medium 102 may be 170 degrees centigrade. Conventionally, the frame 100 was removed from the 3D printer and left on a rack to cool. Once the 3D printing medium 102 had cooled to an appropriate temperature, the 3D printing medium 102 was removed from the frame 100 and manually broken down to extract the 3D printed objects 104.

As described above, the inventors have appreciated that this conventional cooling approach is very slow and have developed techniques to reduce the cooling time required to cool the 3D printing medium 102 and, thereby, reduce the amount of time between completion of the printing and handling of the 3D printing medium 102 to extract the 3D printed objects 104.

In some embodiments, the cooling time required to cool the 3D printing medium 102 may be reduced by inserting one or more cooling devices into the 3D printing medium 102. These cooling devices may extract heat from the 3D printing medium 102 and, thereby, reduce the time required to cool the 3D printing medium 102. Simply inserting cooling devices into the 3D printing medium 102, however, may damage the 3D printed objects 104 in the 3D printing medium 102. For example, the cooling devices may include a tube that is to be inserted into the 3D printing medium 102. An operator inserting the tube into the 3D printing medium 102 may inadvertently hit and damage one or more printed objects 104 in the 3D printing medium 102 as the tube is being inserted. Accordingly, the inventors have devised techniques to create unprinted areas in the 3D printing medium 102 for safe insertion of a cooling device without damaging the 3D printed objects 104. An example system that creates these unprinted areas in the 3D printing medium 102 for safe insertion of a cooling device is shown in FIG. 2 by print order processing system 200.

Figure 2:
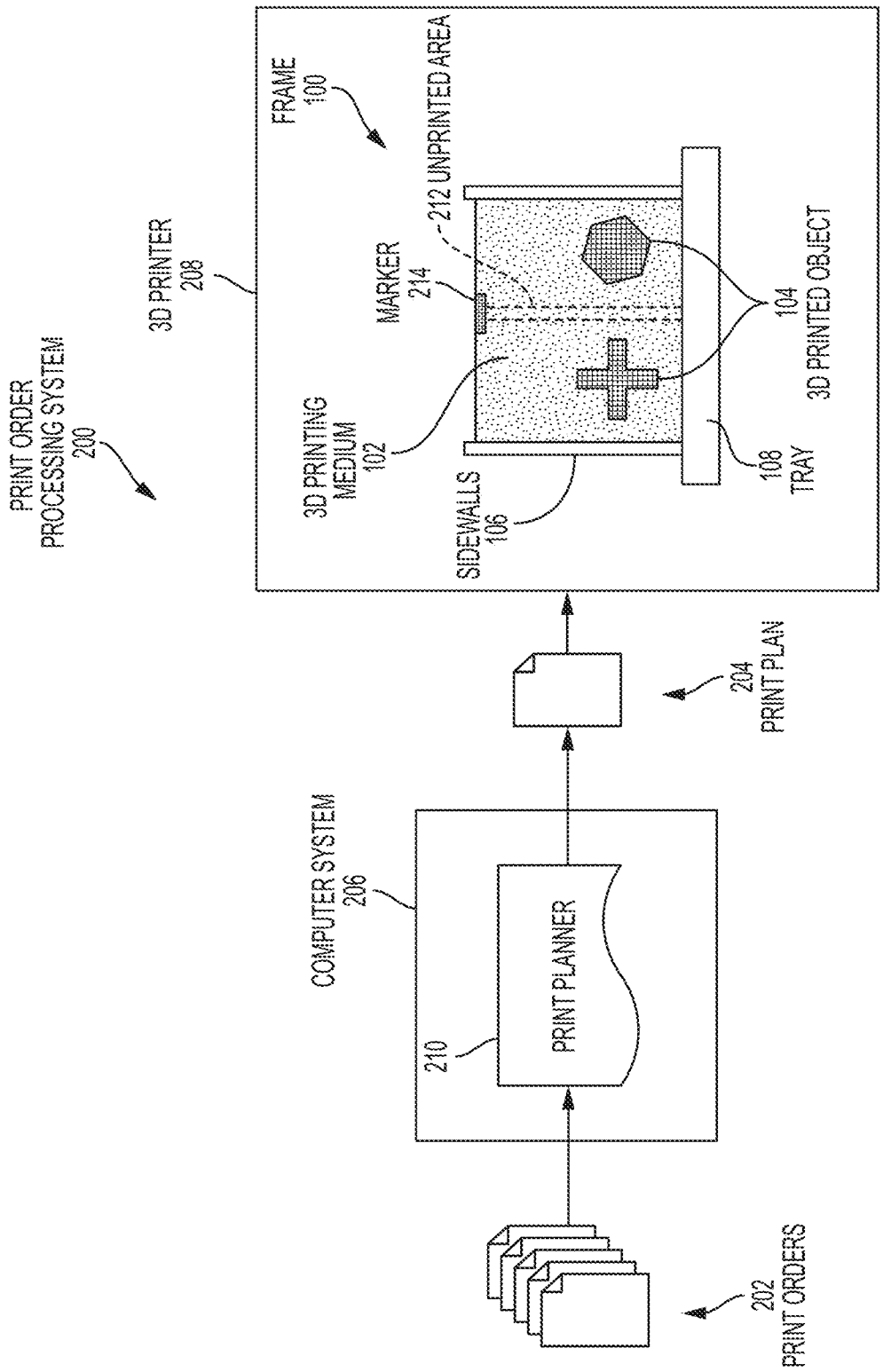
FIG. 2 shows an example print order processing system, according to some embodiments of the technology described herein.

As shown in FIG. 2, the print order processing system 200 includes a computer system 206 that is communicatively coupled to a 3D printer 208 that is configured to print the 3D printed objects 104 in the 3D printing medium 102 in the frame 100. The computer system 206 includes a print planner 210 that receives print orders 202 each including an indication of one or more objects to be printed by the 3D printer 208. In some embodiments, the print planner 210 may be implemented as a computer program (e.g., an application program) that is executed by the computer system 206. The print planner 210 creates a print plan 204 for the 3D printer 208 based on the received print orders 202 that instructs the 3D printer 208 which portions of the 3D printing medium 102 to fuse and/or leave unfused. The print planner 204 may add an unprinted area 212 in the print plan 204 such that a cooling device may be inserted into the 3D printing medium 102 without damaging the 3D printed objects 104. The print planner 210 may also add a marker 214 in the print plan 204 on (or proximate) a surface of the 3D printing medium 102 to ease the identification of the unprinted area 212 after printing is complete.

It should be appreciated that only a single unprinted area 212 and associated marker 214 is shown in FIG. 2 for clarity of illustration and that any suitable number (e.g., one, two, three, four, five, six, seven, eight, ten, etc.) of unprinted area(s) 212 and/or associated marker(s) 214 may be employed.

In some embodiments, the print orders 202 may be orders from one or more customers for particular objects to be printed. These print orders 202 may be sent by customers to the computer system 206 over a network (e.g., the Internet) or in any other suitable way (e.g., a customer may call the business operating the computer system 206 and place an order during the call, by mail, etc.). The print orders 202 may include, for example, an indication of a 3D model to be printed, an address to which the resulting 3D printed object is to be shipped, and/or an indication of a priority of the order (e.g., whether the order is a rush order).

In some embodiments, the print planner 210 may receive the print orders 202 from customers and create the print plan 204 for the 3D printer 208 that includes the objects identified in the print orders 202. The print plan 204 may include a set of instructions for the 3D printer 208 to follow to print the appropriate 3D printed objects 104 in the 3D printing medium 102 to satisfy the received print orders 202. For example, the print plan 204 may specify the particular locations where the 3D printer 208 should fuse the 3D printing medium 102 in the frame 100.

In some embodiments, the print planner 210 may create the print plan 204 by identifying the dimensions of the frame 100 to determine the printing area available for objects to be printed in the 3D printing medium 102. The print planner 210 may insert one or more unprinted areas 212 into the available printing area. The unprinted areas 212 may be areas where the 3D printing medium 102 is purposefully left substantially (e.g., at least 90%, at least 95%, at least 99%, at least 99.9%, 100%) unfused. The print planner 210 may determine the number, location, and dimensions of these unprinted areas 212 based on various factors such as the dimensions of the frame 100, the desired cooling time of the printing medium 102, the number of objects to be printed in the 3D printing medium 102, and/or the size of the objects to be printed in the 3D printing medium 102. For example, the print planner 210 may pack the available printing area with objects to be printed and create a thermal model of the 3D printing medium 102 with the objects to be printed. In this example, the print planner 210 may receive a desired cooling time and use the thermal model to identify an arrangement of unprinted areas 212 to add to the print plan 210 to reduce an expected cooling time of the 3D printing medium 102 below the desired cooling time. In another example, the print planner 210 may include a suggested arrangement of unprinted areas 212 for each type of frame 100. In this example, the print planner 210 may determine the type of frame 100 and add the suggested arrangement of unprinted areas 212 to the print plan 204. The suggested arrangement of unprinted areas 212 may include more unprinted areas for larger size frames and evenly distribute the unprinted areas so as to achieve the desired cooling time for each type of frame 100. Once the suggested arrangement of unprinted areas 212 is added to the print plan 204, the print planner 210 may pack the remaining available print space with objects from the print orders 202 to be printed.

As discussed above, the print planner 210 may determine the suggested arrangement of unprinted areas 212 based on, for example, the dimension 3D printing medium 102 to be cooled. Example arrangements of unprinted areas that may be employed by the print planner 210 are shown in FIGS. 3A-3D by unprinted area arrangements 300A-300D, respectively. Each of the unprinted area arrangements 300A-300D are shown on a top surface of the 3D printing medium 102. The unprinted areas 212 in the unprinted area arrangements 300A-300D may extend into the 3D printing medium 102 (e.g., into the page in FIGS. 3A-3D) to form a column. A summary of the unprinted area arrangements 300A-300D in FIGS. 3A-3D, respectively, is shown below in Table 1.

TABLE 1

Example Arrangements of Unprinted Areas

Figure 3A:
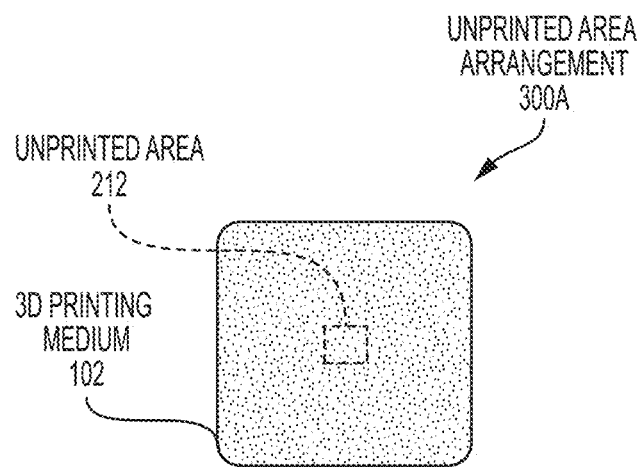
FIGS. 3A-3D each show an example arrangement of unprinted areas on a surface of a 3D printing medium, according to some embodiments of the technology described herein.
Figure 3B:
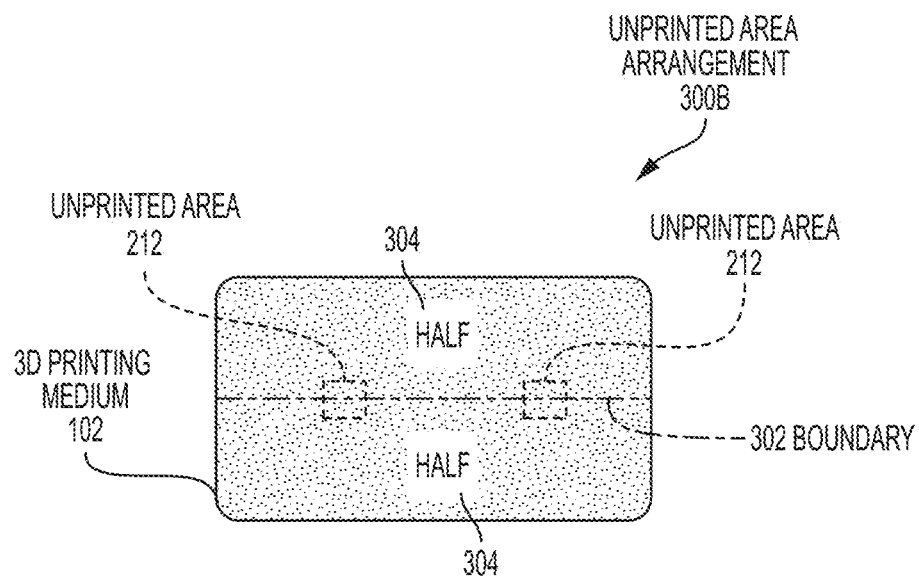
Figure 3C:
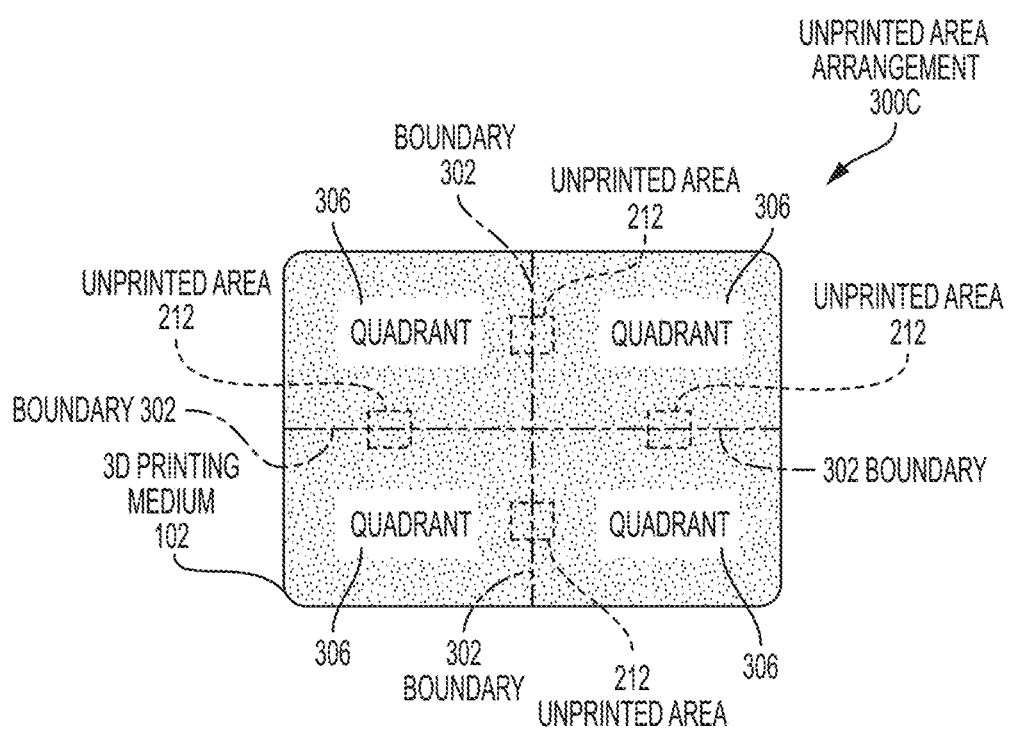
Figure 3D:
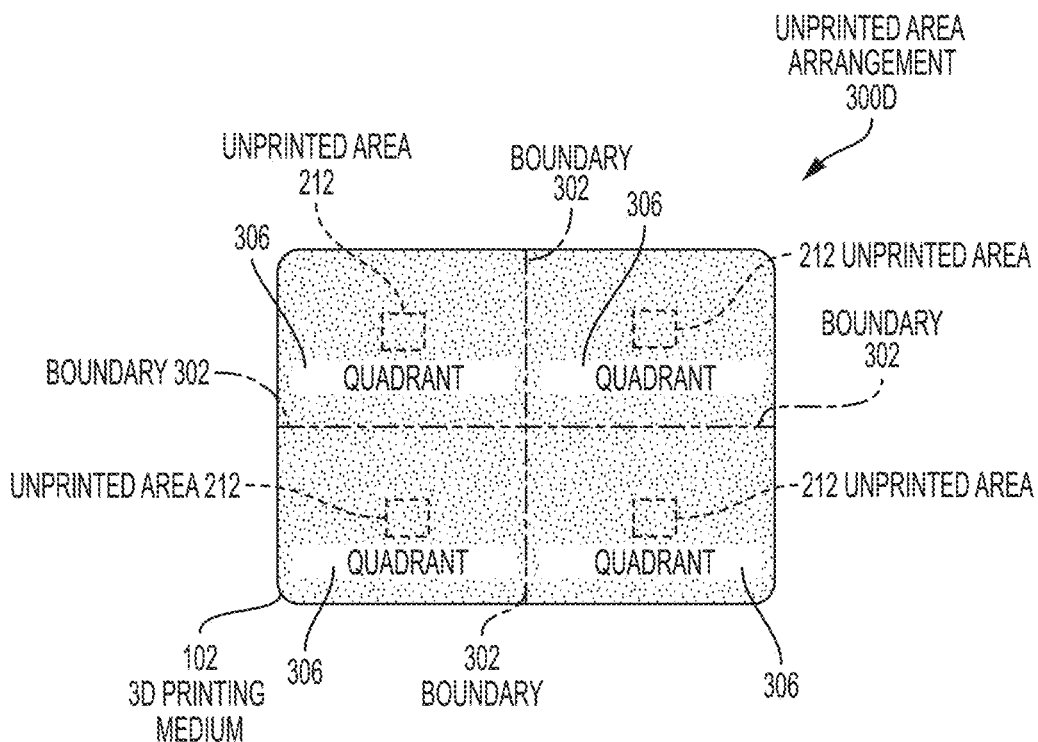

| Size of 3D Printing Medium | Number of Unprinted Areas | Location of Unprinted Areas | FIG. |
|---|---|---|---|
| Small | 1 | Place unprinted area at center of top surface of 3D printing medium | FIG. 3A |
| Medium | 2 | Divide top surface of 3D printing medium into two sections (e.g., halves) and place two unprinted areas along boundary between two sections | FIG. 3B |
| Large | 4 | Divide top surface of 3D printing medium into four sections (e.g., quadrants) and place one unprinted area along each boundary between two of the four sections | FIG. 3C |
| Large | 4 | Divide top surface of 3D printing medium into four sections (e.g., quadrants) and place one unprinted area at the center of each section | FIG. 3D |

FIG. 3A shows an example unprinted area arrangement 300A including only a single unprinted area 212 located at a center of a top surface of the 3D printing medium 102. The unprinted area arrangement 300A may be employed by the print planner 210 to cool, for example, 3D printing mediums 102 with small dimensions where only a single cooling device is necessary to cool the 3D printing medium 102 within the desired cooling time.

FIG. 3B shows an example unprinted area arrangement 300B including two unprinted areas 212 located along a boundary 302 between two halves 304 of the top surface of the 3D printing medium 102. The boundary 302 is a horizontal line that divides the 3D printing medium 102 into two equal halves 304. Each of the two unprinted areas 212 are placed along the boundary 302 and span both halves 304 of the top surface of the 3D printing medium 102. The unprinted areas 212 may be spaced apart on the boundary 302 so as to provide relatively uniform cooling to the 3D printing medium 102 when cooling devices are inserted into the unprinted areas 212. For example, the distance between the unprinted areas 212 on the boundary 302 may be approximately equal (e.g., ±20%, ±10%, ±5%, or ±2%) to twice the distance between the unprinted areas 212 and the nearest edge of the top surface of the 3D printing medium 102. The unprinted area arrangement 300B may be employed by the print planner 210 to cool, for example, 3D printing mediums 102 with medium dimensions where two cooling devices are necessary to cool the 3D printing medium 102 within the desired cooling time.

It should be appreciated that the boundary 302 may be drawn differently in the unprinted area arrangement 300B to form two equal halves 302. For example, the boundary 302 may be drawn vertically across the top surface of the 3D printing medium 102 and the unprinted areas 212 may both be located along the boundary 302 near a center of the top surface of the 3D printing medium 102. In another example, the boundary 302 may be drawn diagonally across the top surface of the 3D printing medium 102 and the unprinted areas 212 may be located proximate the corners of the top surface of the 3D printing medium 102.

FIG. 3C shows an example unprinted area arrangement 300C including four unprinted areas 212 located along boundaries 302 between four quadrants 306 of the top surface of the 3D printing medium 102. The boundaries 302 include a horizontal line and a vertical line that intersect to divide the 3D printing medium 102 into four equal quadrants 306. Each of the four unprinted areas 212 is placed along one of the boundaries 302 and spans two of the quadrants 306 of the top surface of the 3D printing medium 102. The unprinted areas 212 may be spaced apart along the boundaries 302 so as to provide relatively uniform cooling to the 3D printing medium 102 when cooling devices are inserted into the unprinted areas 212. The unprinted area arrangement 300C may be employed by the print planner 210 to cool, for example, 3D printing mediums 102 with large dimensions where four cooling devices are necessary to cool the 3D printing medium 102 within the desired cooling time.

It should be appreciated that the unprinted areas 212 do not always needs to be placed along a boundary 302. For example as shown by arrangement 300D in FIG. 3D, an unprinted area 212 may be placed at a center of each quadrant 306 away from the boundaries 302 on the top surface of the 3D printing medium 102.

Returning to FIG. 2, the print planner 210 may insert markers 214 into the print plan 204 on (or proximate) a surface 3D printing medium 102 to ease identification of the unprinted areas 212 after printing in some embodiments. The markers 214 may be designed to have any of a variety of shapes. For example, the markers 214 may be 3D printed gears with a hole in the center.

In some embodiments, the print planner 210 may determine the arrangement of the 3D objects to be printed in the 3D printing medium 102 after the unprinted area 212 and/or the marker 214 has been added to the print plan 204. This may be done in any suitable way. In some embodiments, the arrangement the 3D objects in the print plan 204 may be determined using software (e.g., integrated into the print planner 210 or integrated into another application deployed locally on computer system 206 or remotely) for determining the packing of objects in a volume. For example, in some embodiments, the arrangement of the 3D objects may be determined using the AUTODESK® NETFABB® software deployed on the computer system 206 or deployed remotely on another computer system.

In some embodiments, the print planner 210 may adjust the location of one or more unprinted areas 212 in the 3D printing medium 102 to pack one or more additional objects into the print plan 204. These adjustments to the location of the unprinted areas 212 may have minimal (if any) impact on the resulting cooling time of the 3D printing medium 102. For example, shifting the location of an unprinted area in any of FIGS. 3A-3D by an inch may have a negligible impact on the cooling time of the 3D printing medium 102 and provide the benefit of allowing another object to be included in the print plan 204. In these embodiments, the print planner 210 may attempt to pack the objects from the print orders 202 into the available print space without adjusting the location of the unprinted areas 212. The print planner 210 may then attempt to fit additional objects from the print orders 202 into the print plan by allowing one or more of the unprinted areas to be shifted by up to a threshold distance (e.g., six inches) from their original location.

In some embodiments, the print planner 210 may prioritize objects from certain print orders 202 over others to include in the print plan 204. For example, the print planner 210 may receive print orders 202 for seven objects and determine that only six of the seven objects may be added to the print plan 204. In this example, the print planner 210 may determine a priority for each of the objects to be printed and add the objects with the highest priority to the print plan 204 while leaving the lower priority objects to be added to a subsequent print plan 204. The print planner 210 may determine the priority of each object by reading priority information from the print orders 202. For example, the objects from print orders 202 that include a "rush" designation may receive a higher priority than objects from other print orders 202.

It should be appreciated that, in some embodiments, any (or all) of the functions attributed to the print planner 210 may be performed with the assistance of an operator. For example, the print planner 210 may add the unprinted areas 212 to the print plan 204 by displaying a visual representation of the available printing area in the 3D printing medium 102 to the operator and permitting the operator to designate areas as the unprinted areas 212 in the visual representation of the available printing area.

In some embodiments, the print plan 204 may be a file including a sequence of instructions (in any suitable format) for the 3D printer 208 to print the appropriate 3D printed objects 104 in the 3D printing medium 102 so as to fulfill one or more of the print orders 202. In some embodiments, the print plan 204 may not be sent directly from the computer system 206 to the 3D printer 208. For example, the print plan 204 may be provided to a scheduling system (not shown) that monitors the availability of a cluster of 3D printers 208. The scheduling system may determine whether any of the 3D printers 208 in the cluster are available and assign the print plan 204 to an available 3D printer 208. In other embodiments, the print plan 204 may be sent to 3D printer 208 directly from computer system 206.

In some embodiments, the 3D printer 208 may receive the print plan 204 and create the 3D printed objects 104 in the 3D printing medium 102 using the instructions included in the print plan 204. The 3D printer 208 may be any of a variety of types of 3D printers. For example, the 3D printer 208 may be an SLS printer.

After the 3D printed objects 104 have been printed in the frame 100, the frame 100 may be removed from the 3D printer 208 and cooled. In some embodiments, various cooling techniques may be employed to further reduce the cooling time before the cooling devices are inserted into the unprinted areas 212 of the 3D printing medium 102. For example, the cooling process may be expedited by removing the sidewalls 106 from the frame 100. The sidewalls 106 are typically constructed with a material that retains heat well such as a metal. Removing the sidewalls 106 from the frame 100 allows heat to more easily pass from the 3D printing medium 102 to the ambient air. Further, the sidewalls 106 may be re-used for printing while the 3D printing medium 102 is cooling by attaching the sidewalls 106 to a different tray 108 to form a new frame 100 and inserting the new frame 100 into the 3D printer 208. In another example, the 3D printing medium 102 may be compressed with a wrap to remove at least a portion of the trapped air in the 3D printing medium 102. The trapped air is a good insulator that slows heat transfer between the 3D printing medium 102 and ambient air. Thereby, removal of the trapped air improves heat transfer between the 3D printing medium 102 and the ambient air. The wrap may be a plastic wrap such as a cellophane wrap.

Figure 4:
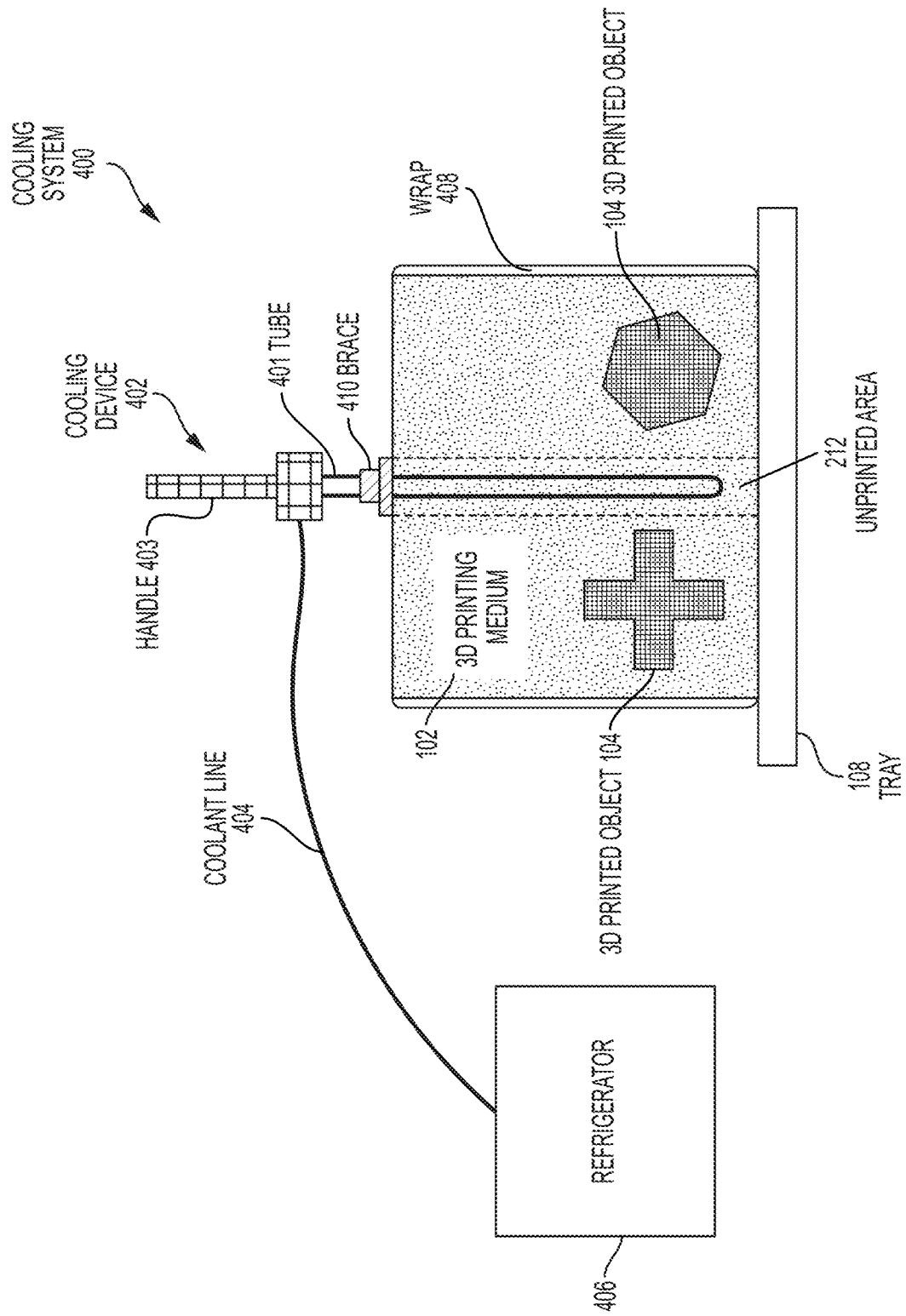
FIG. 4 shows an example cooling system, according to some embodiments of the technology described herein.

As discussed above, cooling devices may be inserted into the unprinted areas 212 of the 3D printing medium 102 to expedite cooling. These cooling devices may form part of a cooling system. One illustrative of such a cooling system is the cooling system 400 shown in FIG. 4. In the illustrated embodiment of FIG. 4, cooling system 400 includes one or more cooling devices 402 that are inserted into the 3D printing medium, a refrigerator 406, and one or more coolant lines 404 fluidly coupling refrigerator 406 to cooling devices 402. Relative to the frame 100 shown in FIG. 2, the sidewalls 106 have been removed, the 3D printing medium 102 has been wrapped with a wrap 408 to compress the 3D printing medium 102, the marker 214 has been removed from the 3D printing medium 102, and the cooling device 402 has been inserted into the 3D printing medium 102 at the same point where the marker 214 was located. The cooling device 402 includes a tube 401 that circulates a fluid to cool the 3D printing medium 102. The cooling device 402 includes a handle 403 to ease insertion of the cooling device 402 into the 3D printing medium 102. The cooling system 400 also includes a brace 410 to guide insertion of the cooling device 402 into the 3D printing medium 102 that is approximately perpendicular (e.g., ±20 degrees, ±10 degrees, ±5 degrees, or ±2 degrees) to the top surface of the 3D printing medium 102. It should be appreciated that only a single cooling device 402 in a single unprinted area 212 is shown in FIG. 4 for clarity of illustration and that any suitable number (e.g., one, two, three, four, five, six, seven, eight, ten, etc.) of cooling devices 402 and/or unprinted area(s) 212 may be employed.

In some embodiments, the cooling device 402 may be configured to be inserted into the unprinted area 212 to cool the 3D printing medium 102. For example, the cooling device 402 may include a tube 401 that penetrates the 3D printing medium 102 and circulates a fluid that is cooler than the 3D printing medium 102. Thereby, heat may be transferred from the 3D printing medium 102 to the fluid in the tube 401. The cooling device 402 may be configured to couple the tube 401 to the coolant line 404 using, for example, one or more fittings to send the warmed fluid to the refrigerator 406 and receive cool fluid from the refrigerator 406.

In some embodiments, the coolant line 404 may fluidly couple the refrigerator 406 to the cooling device 402. For example, the coolant line 404 may include a first tube that carries chilled fluid from the refrigerator 406 to the cooling device 402 and a second tube that carries warmed fluid from the cooling device 402 to the refrigerator 406. The coolant line 404 may include one or more a tubes constructed from any of a variety of materials. For example, the tubes may be metal tubes, plastic tubes, and/or composite tubes. In some embodiments, at least a portion of the coolant line 404 may be flexible.

For example, a portion of the coolant line 404 that is proximate the cooling device 402 may be flexible to allow easy insertion and removal of the cooling device 402 from the 3D printing medium 102 without moving the 3D printing medium 102 and/or the refrigerator 406.

In some embodiments, the refrigerator 406 may be configured to cool the fluid received from the cooling device 402 and provide the chilled fluid to the cooling device 402. In some embodiments, the refrigerator 406 may cool the fluid using a heat exchanger that moves heat from the fluid to the ambient air. In some embodiments, the refrigerator 406 may include a pump that circulates the fluid through a radiator that transfers heat from the fluid to the ambient air. Additionally or alternatively, the refrigerator 406 may include a fan to move air across the radiator to increase the cooling effect of the radiator.

In some embodiments, the refrigerator may include a compressor that compresses the received fluid and circulates the fluid through a condenser that converts the fluid from a gaseous state to a liquid state. The condenser may convert the fluid from a gaseous state to a liquid state by transferring heat from the fluid to the ambient air.

The fluid employed in the cooling system 400 may take any of a variety of forms. In some embodiments, the fluid may be a liquid coolant such as a mixture of water and propylene glycol. In another example, the fluid may be a refrigerant that changes between a gaseous state and a liquid state as the refrigerant moves between the refrigerator 406 and the cooling device 402.

Figure 5:
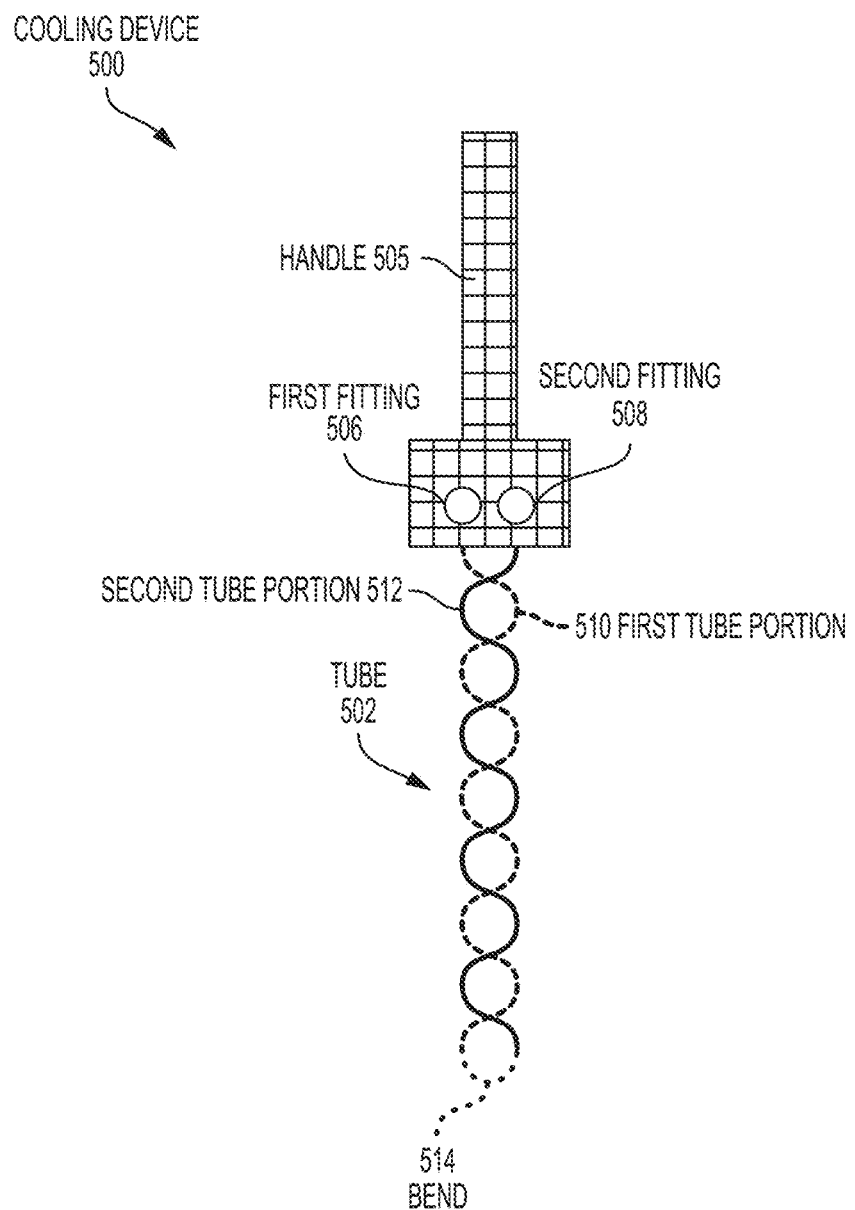
FIG. 5 shows an example cooling device, according to some embodiments of the technology described herein.

FIG. 5 shows a detailed example of a cooling device 500 that may be employed as cooling device 402 shown in FIG. 4. As shown, the cooling device 500 includes a handle 505 attached to a tube 502 including a first tube portion 510, a second tube portion 512, and a bend 514 that is approximately 180 degrees (e.g., ±20 degrees, ±10 degrees, ±5 degrees, or ±2 degrees). The tube 502 may be coupled to a coolant line (e.g., coolant line 404 in FIG. 4) by first and second fittings 506 and 508, respectively. For example, the first fitting 506 may couple the first tube portion 510 to a first tube of the coolant line to receive cool fluid. In this example, the second fitting 508 may couple the second tube portion 512 to a second tube of the coolant line to provide warm fluid.

In some embodiments, the first tube portion 510 may be twisted with the second tube portion 512 to form a spiral in the tube 502. Twisting the tube 502 in a spiral may add rigidity to the tube 502 to ease insertion into the 3D printing medium without bending or otherwise damaging the tube 502. Twisting the tube 502 may also increase a surface area of the tube 502 that is in contact with the 3D printing medium to enhance cooling.

In some embodiments, the tube 502 and/or the first and second fittings 506 and 508, respectively, may be formed from a metal such as copper, aluminum, titanium, and steel. For example, the tube 502 may be a copper tube with a diameter of approximately 0.25 inches (e.g., ±0.2 inches, ±0.1 inches, ±0.05 inches, or ±0.01 inches) and the first and second fittings 506 and 508, respectively, may also be formed from copper.

As discussed above, a cooling device may be inserted into an unprinted area in the 3D printing medium to cool the 3D printing medium. The inventors have appreciated that it may be difficult for an operator to insert the cooling device into the 3D printing medium while keeping the cooling device approximately perpendicular (e.g., ±20 degrees, ±10 degrees, ±5 degrees, or ±2 degrees) to the surface of the 3D printing medium that the cooling device penetrated. Thereby, the operator may inadvertently cause the cooling device to go outside the designated unprinted area and potentially damage a 3D printed object in the 3D printing medium. Accordingly, the inventors have developed various braces to guide the insertion of the cooling device into the 3D printing medium.

An illustrative example of such a brace is shown in FIGS. 6A and 6B by brace 600. FIG. 6A shows a side-view of the brace 600 on the 3D printing medium 102 and FIG. 6B shows a top-view of the brace 600 on the 3D printing medium 102. The brace 600 may be configured to rest against the 3D printing medium 102 (or a wrap surrounding the 3D printing medium 102) and guide the vertical insertion of a cooling device into the 3D printing medium 102. As shown, the brace 600 includes a flange 604 that stabilizes the brace 600 against the 3D printing medium 102 and a guide 602 with a hole 606 to receive the cooling device. In some embodiments, The guide 602 may be configured to receive the cooling device and guide insertion of the cooling device into the 3D printing medium 102 at an angle that approximately perpendicular (e.g., ±20 degrees, ±10 degrees, ±5 degrees, or ±2 degrees) to a surface of the 3D printing medium 102. The guide 602 may be, for example, cylindrical in shape with a hole 606 at the center to permit entry of the cooling device. It should be appreciated that guide 602 is not limited to guiding only approximately perpendicular insertion of a cooling device into 3D printing medium 102 and, in some embodiments, may be configured to receive the cooling device and guide its insertion in the 3D printing medium 102 at any other suitable angle.

In some embodiments, the flange 604 may be configured to stabilize the brace 600 against the 3D printing medium 102. In some embodiments, the flange 604 may be integral with the guide 602. The flange 604 may be constructed as a disk with a hollow center that is wider than the guide 606. The flange 604 may be made from rubber, plastic, or any other suitable material(s).

Figure 7B:
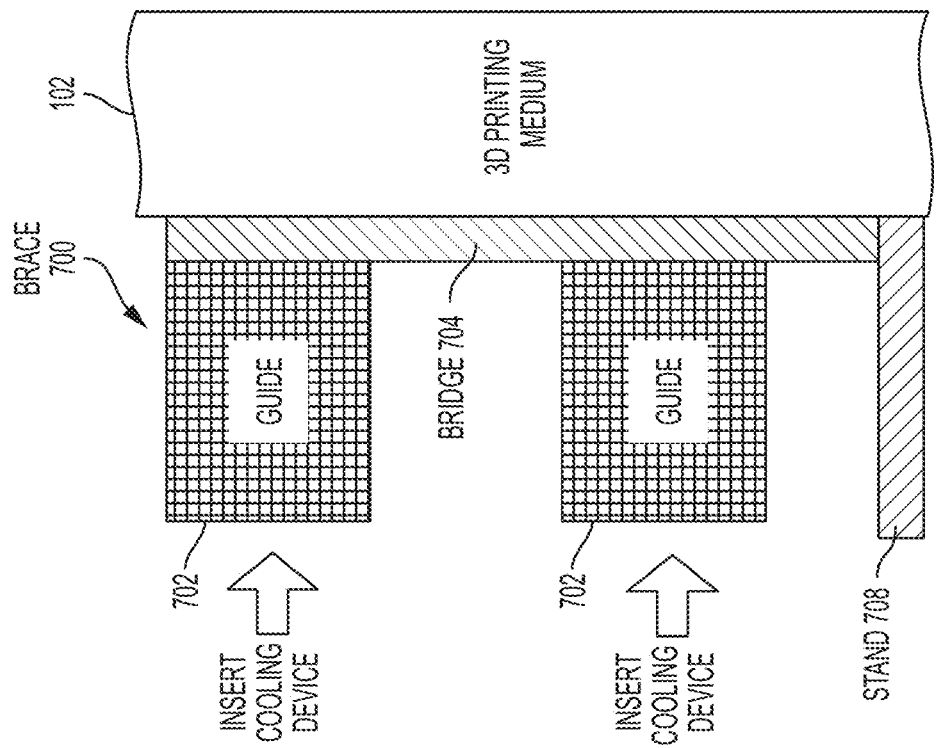
FIG. 7B shows a side view of the example brace of FIG. 7A, according to some embodiments of the technology described herein.
Figure 7A:
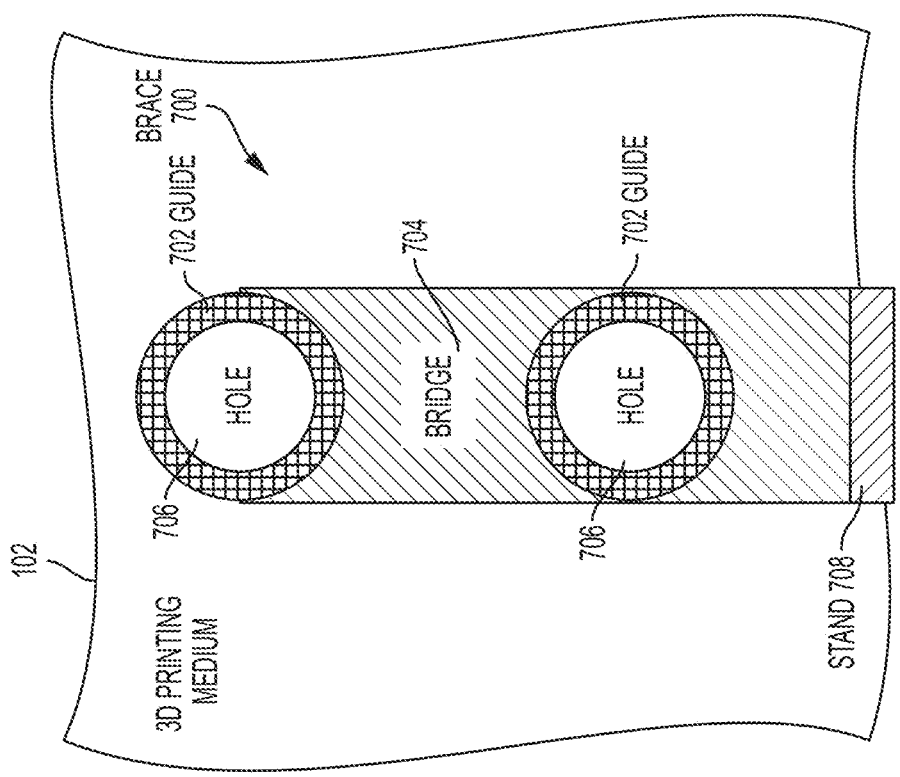
FIG. 7A shows a front view of another example brace for a cooling device, according to some embodiments of the technology described herein.

FIGS. 7A and 7B show another example brace 700. FIG. 7A shows a side-view of the brace 700 on the 3D printing medium 102 and FIG. 7B shows a top-view of the brace 700 on the 3D printing medium 102. The brace 700 may be configured to guide horizontal insertion of two cooling devices into the 3D printing medium 102. As shown, the brace 700 includes two guides 702 each with a hole 706 to permit insertion of a cooling device. A bridge 704 connects the two guides 702 together and also connects the guides 702 to a stand 708. The stand 708 may rest on a shelf or other flat surface to hold the guides 702 at the appropriate distances above the bottom of the 3D printing medium 102. The guides 702 may be integral with the bridge 704 and/or the stand 708.

Figure 8A:
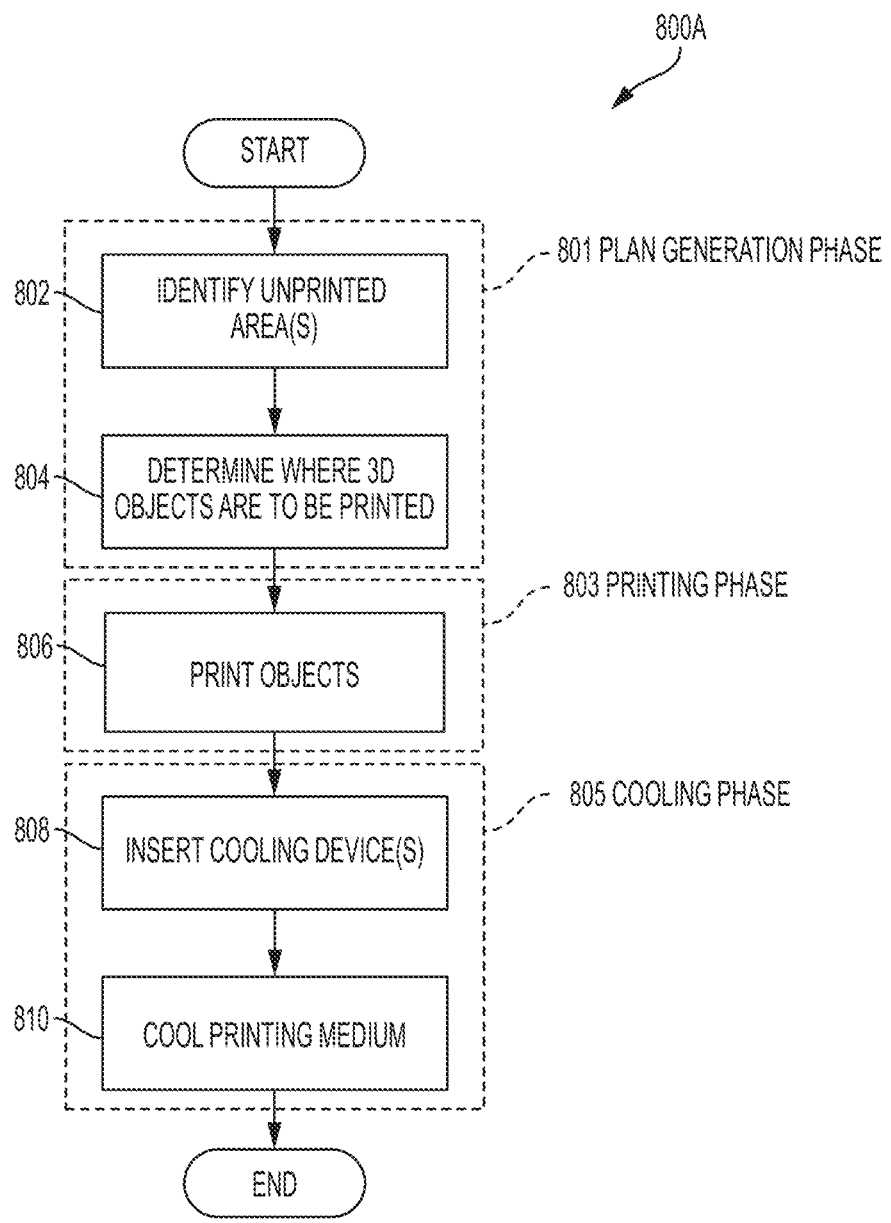
FIGS. 8A and 8B each show an example method of manufacturing 3D printed objects, according to some embodiments of the technology described herein.

As discussed above, the cooling techniques disclosed herein may be employed to reduce the cooling time in 3D printed object manufacturing processes such as, for example, processes employed by providers of on-demand printing services. An example 3D printed object manufacturing process 800A employing various cooling techniques disclosed herein is shown in FIG. 8A. Process 800A may be performed at least in part by using print order processing system 200 and cooling system 400 described with reference to FIG. 2 and FIG. 4, respectively.

As shown, the 3D printed object manufacturing process 800A includes a plan generation phase 801 where a print plan is generated, a printing phase 803 where 3D objects are printed in accordance with the print plan, and a cooling phase 805 where the 3D printing medium with the 3D printed objects is cooled. The plan generation phase 801 includes an act 802 of identifying unprinted area(s) and an act 804 of determining where 3D objects are to be printed. The printing phase 803 includes an act 806 of printing the 3D objects. The cooling phase 805 includes an act 808 of inserting cooling device(s) into the 3D printing medium and an act 810 of cooling the 3D printing medium.

In act 802, unprinted area(s) are identified to permit the insertion of cooling device(s) into the resulting 3D printing medium without damaging 3D printed objects in the 3D printing medium. The identified unprinted area(s) may be added to a print plan for a 3D printer, such as an SLS printer.

The unprinted area(s) may be identified by, for example, a print planner application (e.g., print planner 210) executed on a computer system (e.g., computer system 206). The number and/or location of the unprinted area(s) may be determined based on various parameters such as the dimensions of the 3D printing medium to be cooled, a desired cooling time, a size of the cooling device(s) to be inserted into the 3D printing medium, and/or a number of objects to be printed in the 3D printing medium. In some embodiments, the number of unprinted area(s) may be increased as the size of the 3D printing medium increases to maintain a constant or similar cooling time across 3D printing media of different sizes. Further, the unprinted area(s) may be evenly spaced to cool the 3D printing medium in a more uniform fashion. For example, the 3D printing medium may require four unprinted areas to be inserted into the cooling medium to achieve a desired cooling time. In this example, a surface of the 3D printing medium may be divided into four quadrants and each of the four unprinted areas may be located at a boundary between two of the four quadrants.

In some embodiments, markers may be added to print plan to mark the location of the unprinted areas. For example, a marker object may be added to the print plan that is to be printed at (or proximate) a surface of the 3D printing medium to mark an access point to the unprinted area. In this example, subsequent identification of the access point to the unprinted area may be performed by locating the marker on the surface of the 3D printing medium.

In act 804, the locations where the 3D objects are to be printed in the 3D printing medium are determined and added to the print plan. The locations may be identified by, for example, a print planner application (e.g., print planner 210) executed on a computer system (e.g., computer system 206). In some embodiments, the locations may be identified by such that none of the 3D objects intersect the unprinted areas identified in act 802. It should be appreciated that the location of the unprinted areas may be adjusted to permit additional objects to be printed in the 3D printing medium. For example, the unprinted areas may be permitted to be shifted by up to a maximum distance from their original location (e.g., five inches) if the resulting shift allows for at least one additional object to be added to the print plan. Once the objects have been added to the print plan, the print plan may be sent to a 3D printer.

In act 806, 3D objects may be printed by a 3D printer in accordance with a print plan. For example, an SLS printer may receive the print plan and fuse portions of a 3D printing medium together to form the 3D objects in a 3D printing medium identified in the print plan.

In act 808, cooling device(s) may be inserted into the unprinted area(s) in the 3D printing medium. In some embodiments, the unprinted area(s) may be identified by locating the marker(s) on the surface of the 3D printing medium. Once the locations of the unprinted area(s) have been identified, braces may be placed on the 3D printing medium over the unprinted area(s) to guide insertion of the cooling device(s). Then, the cooling device(s) may be inserted into the 3D printing medium through the braces at an angle that is approximately perpendicular (e.g., ±20 degrees, ±10 degrees, ±5 degrees, or ±2 degrees) to a surface of the 3D printing medium that the cooling device(s) penetrated.

In act 810, the 3D printing medium may be cooled using the inserted cooling device(s). For example, fluid may be circulated through the inserted cooling device to extract heat from the 3D printing medium.

Figure 8B:
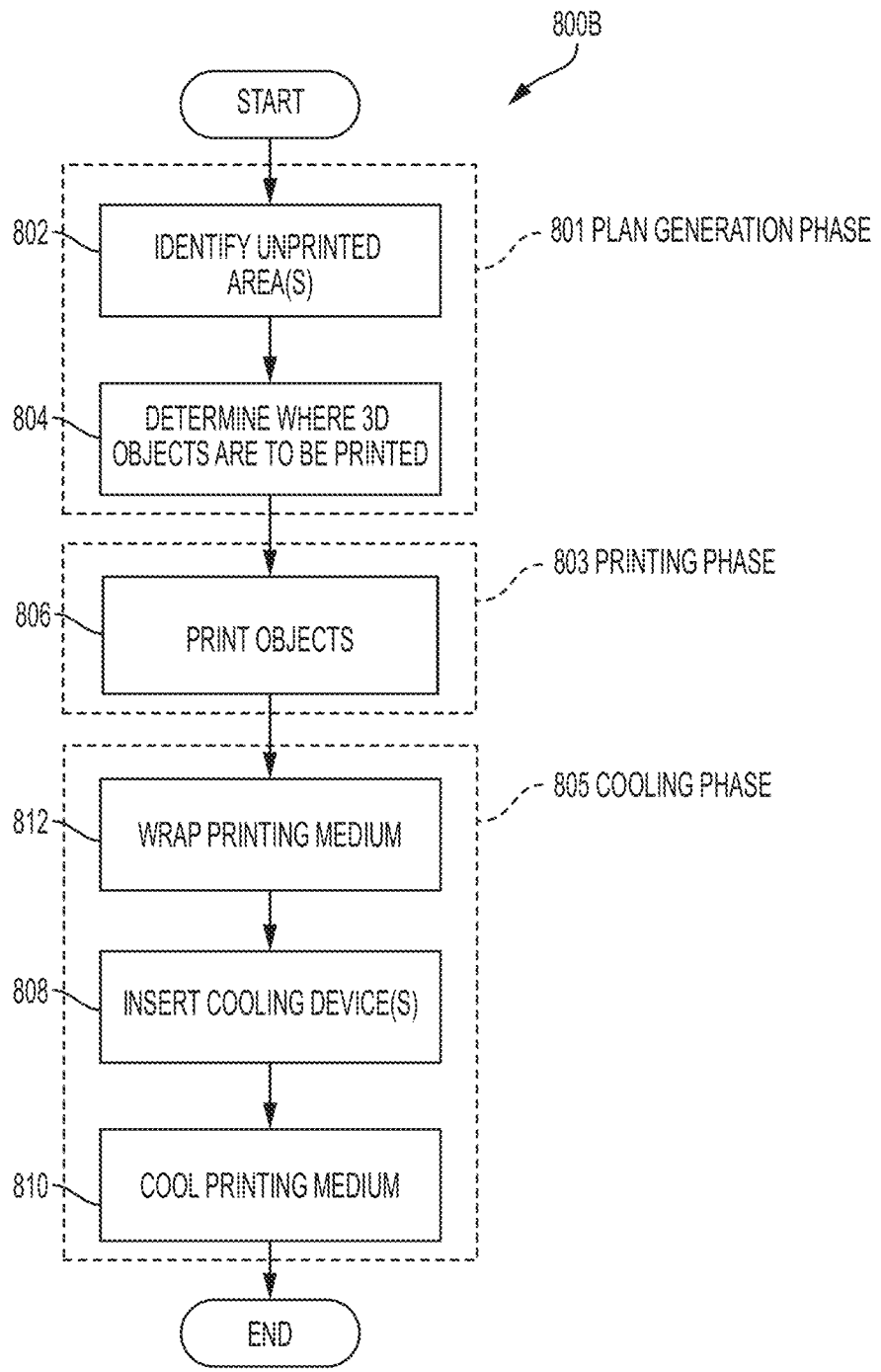

It should be appreciated that various alterations may be made to the 3D printed object manufacturing process 800A without departing from the scope of the present disclosure. For example, the 3D printing medium may be wrapped between the printing in act 806 and the insertion of the cooling device(s) in act 808. Wrapping the 3D printing medium may compress the 3D printing medium to remove some of the air trapped in the 3D printing medium and, thereby, improve heat transfer between the 3D printing medium and the ambient air. An example of such a 3D printed object manufacturing process is shown in FIG. 8B by the 3D printed object manufacturing process 800B. The 3D printed object manufacturing process 800B adds an act 812 of wrapping the 3D printing medium in the cooling phase 805 relative to the 3D printed object manufacturing process 800A.

In act 812, the 3D printing medium may be wrapped with a wrap. For example, any enclosure that covers the sides of the 3D printing medium (e.g., sidewalls 106 in FIG. 1) may be removed to expose the 3D printing medium. Once the 3D printing medium has been exposed, the 3D printing medium may be wrapped with a wrap such as a cellophane wrap to compress the 3D printing medium. It should be appreciated that the entire 3D printing medium or any portion of the 3D printing medium may be wrapped.

Figure 9:
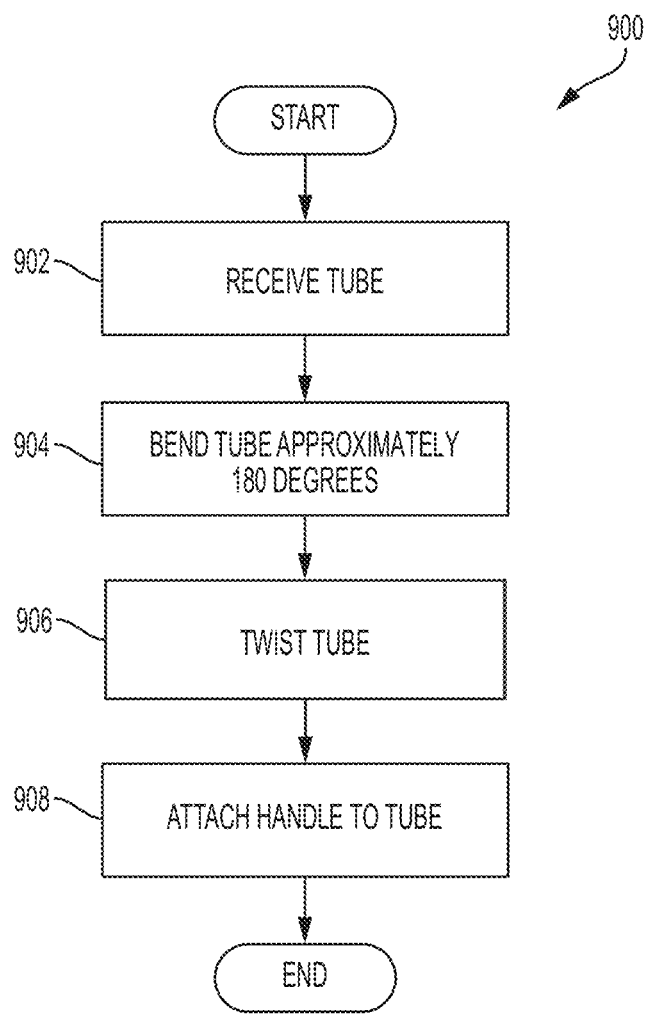
FIG. 9 shows an example method of manufacturing a cooling device, according to some embodiments of the technology described herein.

As discussed above, cooling devices may be configured for insertion into the 3D printing medium to expedite cooling of the 3D printing medium. An example of such a cooling device is described with reference to FIG. 5 that includes a tube that is twisted in a spiral shape with a bend in the center that is approximately 180 degrees (e.g., ±20 degrees, ±10 degrees, ±5 degrees, or ±2 degrees). An example cooling device manufacturing process to manufacture the cooling device 500 shown in FIG. 5 is shown in FIG. 9 by the cooling device manufacturing process 900. As shown, the cooling device manufacturing process 900 includes an act 902 of receiving a tube, an act 904 of bending the tube approximately 180 degrees, an act 906 of twisting the tube, and an act 908 of attaching the handle.

In act 902, a tube may be received. The tube may be a straight tube constructed from a metal such as copper, aluminum, and steel. For example, the tube may be a straight copper tube with a diameter of approximately 0.25 inches (e.g., ±0.2 inches, ±0.1 inches, ±0.05 inches, or ±0.01 inches). It should be appreciated that the particular construction of the tube may vary based on the particular implementation.

In act 904, the tube may be bent by approximately 180 degrees (e.g., ±20 degrees, ±10 degrees, ±5 degrees, or ±2 degrees). The bend may be added to the tube at approximately a center of the tube. In some embodiments, the bend may be added to the tube in a multi-step process to reduce the possibility of the tube collapsing at the bend. For example, the tube may be bent approximately 90 degrees (e.g., ±10 degrees, ±5 degrees, ±2.5 degrees, or ±1 degree) and water may be added to the tube to fill the bend. In this example, the water in the bend may be frozen before further bending the tube to achieve a bend of approximately 180 degrees (e.g., ±20 degrees, ±10 degrees, ±5 degrees, or ±2 degrees).

In act 906, the tube may be twisted. For example, the bend in the tube may be locked in a vice-grip and the ends of the tube may be twisted with each other to form a spiral. In this example, the spiral shape may be locked into the tube by heating the twisted tube and melting solder onto the twisted tube.

In act 908, a handle may be attached to the tube. For example, the handle may include an undersized receptacle to receive a portion of the tube that is pressed onto the tube to form a force fit. In another example, the handle may include an adjustable clamp mechanism that may be loosened to receive a portion of the tube and tightened to lock the tube in place.

The processes described above are illustrative embodiments and are not intended to limit the scope of the present disclosure. The acts in the processes described above may be ordered in any suitable way. Accordingly, embodiments may be constructed in which acts are performed in an order different than illustrated, which may include performing some acts simultaneously, even though shown as sequential acts in illustrative embodiments.

Figure 10:
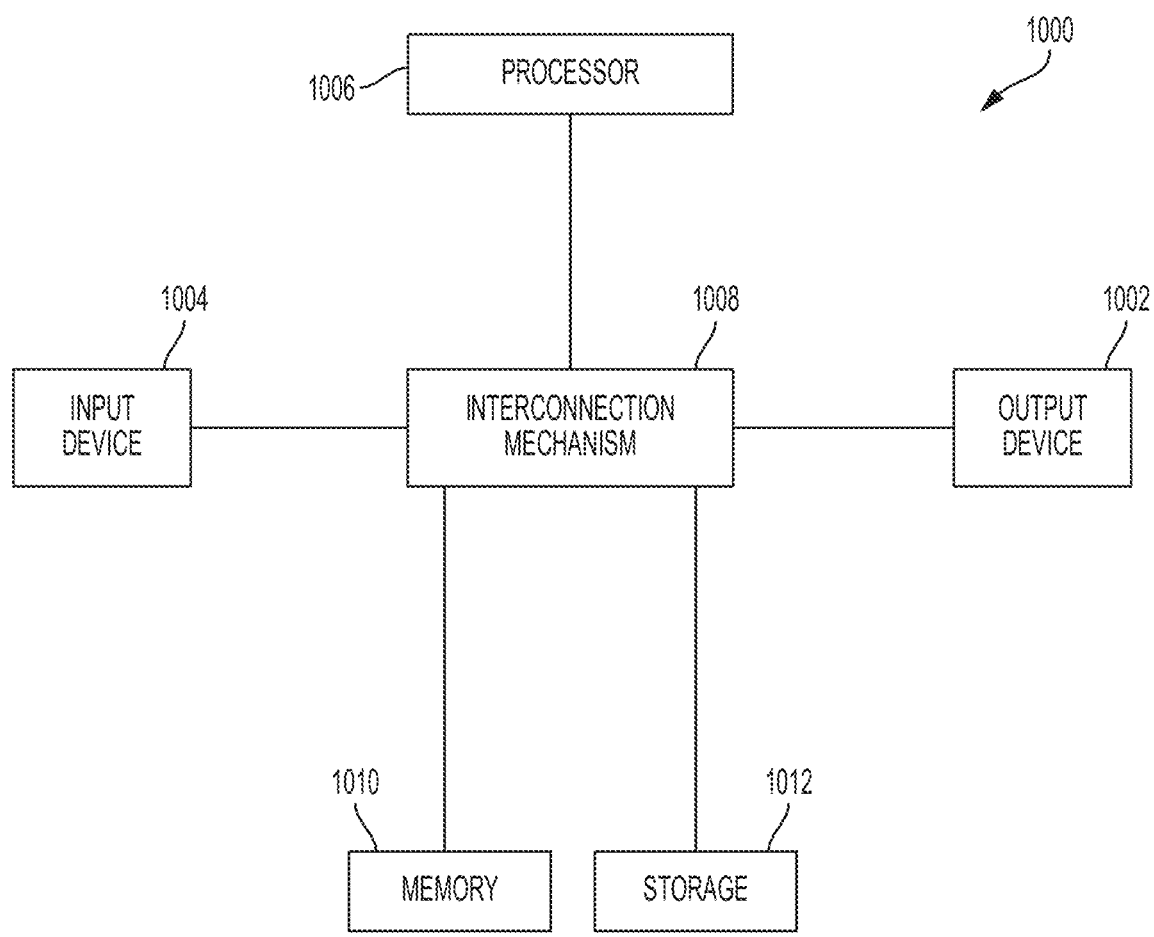
FIG. 10 is a block diagram of an example special-purpose computer system, according to some embodiments of the technology described herein.

In some embodiments, a special-purpose computer system (e.g., computer system 206 shown in FIG. 2) can be specially configured to generate a print plan based on received print orders through, for example, the installation of a print planner computer program as described herein. FIG. 10 shows a block diagram of an example special-purpose computer system 1000 which may perform various processes described herein including, for example, the acts in the plan generation phase 801 of the manufacturing processes illustrated above in FIGS. 8A and 8B. As shown in FIG. 10, the computer system 1000 includes a processor 1006 connected to a memory device 1010 and a storage device 1012. The processor 1006 may manipulate data within the memory 1010 and copy the data to storage 1012 after processing is completed. The memory 1010 may be used for storing programs and data during operation of the computer system 1000. Storage 1012 may include a computer readable and writeable nonvolatile recording medium in which computer executable instructions are stored that define a program to be executed by the processor 1006. According to one embodiment, storage 1012 comprises a non-transient storage medium (e.g., a non-transitory computer readable medium) on which computer executable instructions are retained.

Components of computer system 1000 can be coupled by an interconnection mechanism 1008, which may include one or more busses (e.g., between components that are integrated within a same machine) and/or a network (e.g., between components that reside on separate discrete machines). The interconnection mechanism enables communications (e.g., data, instructions) to be exchanged between system components of system 1000. The computer system 1000 may also include one or more input/output (I/O) devices 1002 and 1004, for example, a keyboard, mouse, trackball, microphone, touch screen, a printing device, display screen, speaker, etc. to facilitate communication with other systems and/or a user.

The computer system 1000 may include specially-programmed, special-purpose hardware, for example, an application-specific integrated circuit (ASIC). Aspects of the present disclosure can be implemented in software, hardware or firmware, or any combination thereof. Although computer system 1000 is shown by way of example, as one type of computer system upon which various aspects of the present disclosure can be practiced, it should be appreciated that aspects of the present disclosure are not limited to being implemented on the computer system as shown in FIG. 10. Various aspects of the present disclosure can be practiced on one or more computers having a different architectures or components than that shown in FIG. 10.

Various embodiments described above can be implemented using an object-oriented programming language, such as Java, C++, Ada, or C# (C-Sharp). Other programming languages may also be used. Alternatively, functional, scripting, and/or logical programming languages can be used. Various aspects of the present disclosure can be implemented in a non-programmed environment (e.g., documents created in HTML, XML or other format that, when viewed in a window of a browser program, render aspects of a graphical-user interface (GUI) or perform other functions). The system libraries of the programming languages are incorporated herein by reference. Various aspects of the present disclosure can be implemented as programmed or non-programmed elements, or any combination thereof.

It should be appreciated that various embodiments can be implemented by more than one computer system. For instance, the system can be a distributed system (e.g., client server, multi-tier system) that includes multiple special-purpose computer systems. These systems can be distributed among a communication system such as the Internet.

Various aspects of the present disclosure may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Further, some actions are described as taken by a "user" or "operator." It should be appreciated that a "user" or "operator" need not be a single individual, and that in some embodiments, actions attributable to a "user" may be performed by a team of individuals and/or an individual in combination with computer-assisted tools or other mechanisms.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

The terms "approximately" and "about" may be used to mean within ±20% of a target value in some embodiments, within ±10% of a target value in some embodiments, within ±5% of a target value in some embodiments, and yet within ±2% of a target value in some embodiments. The terms "approximately" and "about" may include the target value.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

Having described above several aspects of at least one embodiment, it is to be appreciated various alterations, modifications, and improvements will readily occur to those skilled in the art. For example, the cooling techniques may be used in conjunction with other additive 3D printing techniques. Such alterations, modifications, and improvements are intended to be object of this disclosure. Accordingly, the foregoing description and drawings are by way of example only.

What is claimed is:

1. A method of manufacturing three-dimensional (3D) objects, the method comprising:

generating a plan for printing a plurality of 3D objects in a 3D printing medium, prior to printing any of the plurality of 3D objects, the plan for printing including identifying at least one area of the 3D printing medium to remain unprinted for insertion of at least one cooling device;

printing, using a 3D printer, at least some of the plurality of 3D objects in the 3D printing medium in accordance with the generated plan;

after printing the at least some of the plurality of 3D objects in the 3D printing medium, cooling the 3D printing medium, the cooling comprising:

inserting a cooling device into an unprinted region of the 3D printing medium through a brace placed on the 3D printing medium, the cooling device configured to remove heat from the 3D printing medium via a fluid contained in a tube of the cooling device; and circulating the fluid through the cooling device while the cooling device is inserted in the unprinted region of the 3D printing medium; and after cooling the 3D printing medium, removing the at least some of the plurality of 3D objects from the 3D printing medium.

2. The method of claim 1, wherein inserting the cooling device through the brace comprises inserting the cooling device through the brace in one of a substantially vertical position and a substantially horizontal position in the 3D printing medium.

3. The method of claim 1, wherein the cooling device comprises a plurality of probes, and wherein inserting the cooling device comprises inserting the plurality of probes into a respective plurality of unprinted regions of the 3D printing medium.

4. The method of claim 3, wherein inserting the cooling device comprises inserting the plurality of probes through a respective plurality of braces, separate from the cooling device, to guide insertion of the plurality of probes into the 3D printing medium.

5. The method of claim 4, wherein the plurality of probes comprises two probes, and inserting the plurality of probes through a respective plurality of braces comprises inserting two probes through respective two braces in a horizontal position in the 3D printing medium.

6. The method of claim 3, wherein circulating the fluid through the cooling device while the cooling device is inserted in the unprinted region of the 3D printing medium comprises circulating the fluid through each probe of the plurality of probes.

7. The method of claim 6, wherein each probe comprises a tube, and wherein circulating the fluid through each probe of the plurality of probes comprises flowing the fluid into a first portion of the tube from a refrigerator and flowing the fluid out of a second portion of the tube to provide the fluid to the refrigerator.

8. The method of claim 6, wherein circulating the fluid comprises circulating a liquid including water, propylene glycol, or water and propylene glycol.

9. The method of claim 1, the cooling further comprising, prior to inserting the cooling device into the unprinted region of the 3D printing medium, wrapping the 3D printing medium with a plastic wrap.

10. A method of manufacturing three-dimensional (3D) objects, the method comprising:

printing, using a 3D printer, a plurality of 3D objects in a 3D printing medium in accordance with a previously generated plan for printing the plurality of 3D objects in the 3D printing medium wherein the previously generated plan includes at least one area of the 3D printing medium identified to remain unprinted for insertion of at least one cooling device;

after printing the plurality of 3D objects in the 3D printing medium, cooling the 3D printing medium, the cooling comprising:

inserting a cooling device into an unprinted region of the 3D printing medium through a brace placed on the 3D printing medium, the cooling device configured to remove heat from the 3D printing medium via a fluid contained in a tube of the cooling device;

fluidly coupling the cooling device to a refrigerator configured to cool the fluid; and circulating the fluid through the cooling device while the cooling device is inserted in the unprinted region of the 3D printing medium; and after cooling the 3D printing medium, removing the plurality of 3D objects from the 3D printing medium.

11. The method of claim 10, wherein the cooling device comprises a plurality of probes, and wherein inserting the cooling device comprises inserting the plurality of probes into a respective plurality of unprinted regions of the 3D printing medium through a respective plurality of braces.

12. The method of claim 11, wherein inserting the cooling device through the brace comprises inserting two probes through a respective two braces in a horizontal position in the 3D printing medium.

13. The method of claim 11, wherein circulating the fluid through the cooling device while the cooling device is inserted in the unprinted region of the 3D printing medium comprises circulating the fluid through each probe of the plurality of probes.

14. The method of claim 13, wherein each probe comprises a tube, and wherein circulating the fluid through each probe of the plurality of probes comprises flowing the fluid into a first portion of the tube from the refrigerator and flowing the fluid out of a second portion of the tube to provide the fluid to the refrigerator.

15. The method of claim 13, wherein each probe comprises a tube, and circulating the fluid through each probe of the plurality of probes comprises circulating the fluid through a bend in the tube, the bend being approximately 180 degrees.

16. The method of claim 13, wherein each probe comprises a tube, and circulating the fluid through each probe comprises circulating the fluid through a tube comprising copper and having a diameter of approximately 0.25 inches.

17. The method of claim 10, wherein inserting the cooling device through the brace comprises inserting the cooling device in one of a substantially vertical position and a substantially horizontal position in the 3D printing medium.

18. The method of claim 10, wherein circulating the fluid comprises circulating a liquid including water, propylene glycol, or water and propylene glycol.

19. The method of claim 10, the cooling further comprising, prior to inserting the cooling device into the unprinted region of the 3D printing medium, wrapping the 3D printing medium with a plastic wrap.

20. A method of manufacturing three-dimensional (3D) objects, the method comprising:

printing, using a 3D printer, a plurality of 3D objects in a 3D printing medium in accordance with a previously generated plan for printing the plurality of 3D objects in the 3D printing medium, wherein the previously generated plan includes at least one area of the 3D printing medium identified to remain unprinted for insertion of at least one cooling device; and after printing the plurality of 3D objects in the 3D printing medium, inserting a cooling device into an unprinted region of the 3D printing medium through a brace placed on the 3D printing medium, the cooling device configured to cool the 3D printing medium using fluid contained in a tube of the cooling device.

* * * * *